(12) United States Patent　　　　(10) Patent No.:　　US 12,691,679 B2
　　　Tanaka et al.　　　　　　　　　　(45) Date of Patent:　　　Jul. 28, 2026

(54) LIQUID EJECTING APPARATUS

(71) Applicant: BROTHER KOGYO KABUSHIKI KAISHA, Nagoya (JP)

(72) Inventors: Nobumasa Tanaka, Nagoya (JP); Ryuji Horata, Gamagori (JP); Takafumi Nakase, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 206 days.

(21) Appl. No.: 18/524,790

(22) Filed: Nov. 30, 2023

(65) Prior Publication Data

US 2024/0181774 A1　　Jun. 6, 2024

(30) Foreign Application Priority Data

Dec. 1, 2022　(JP) ................................. 2022-192784

(51) Int. Cl.
　　*B41J 2/045*　　　　(2006.01)
　　*H02M 3/07*　　　　(2006.01)
(52) U.S. Cl.
　　CPC ......... *B41J 2/0457* (2013.01); *B41J 2/04548* (2013.01); *B41J 2/04586* (2013.01); *H02M 3/07* (2013.01)
(58) Field of Classification Search
　　CPC .. B41J 2/0457; B41J 2/04548; B41J 2/04586; B41J 2/16532; B41J 2/2142;

(Continued)

(56) References Cited

U.S. PATENT DOCUMENTS 9,090,060 B2 * 7/2015 Cleare .................. B41J 2/04541
11,731,418 B2 * 8/2023 Cleare .................. B41J 2/04541
　　　　　　　　　　　　　　　　　　　　　347/11

(Continued)

FOREIGN PATENT DOCUMENTS

JP　　2007136858 A　*　6/2007
JP　　2018197836 A　*　12/2018　........... G03G 15/065

(Continued)

OTHER PUBLICATIONS

English machine translated version of Kensuke (JP-2018197836-A) (Year: 2018).*

*Primary Examiner* — Ricardo I Magallanes
*Assistant Examiner* — Natasha Dephenia Quinn
(74) *Attorney, Agent, or Firm* — Scully, Scott, Murphy & Presser, P.C.

(57)　　　　　　　ABSTRACT
There is provided a liquid ejecting apparatus including: a liquid ejecting head having a nozzle and configured to eject a liquid from the nozzle; a signal output part having an electrode and configured to output a signal in accordance with an electric change in the electrode in a case that the liquid is ejected from the nozzle; and a voltage applying circuit having a plurality of charge pumps each of which includes a capacitor and a diode, each of which is configured to boost a voltage input thereto and which are connected in series, the voltage applying circuit being configured to apply the voltage boosted by the plurality of charge pumps to the liquid ejecting head or to the electrode, thereby generating a potential difference between the liquid ejecting head and the electrode.

14 Claims, 14 Drawing Sheets

(58) Field of Classification Search
CPC .......................... B41J 2/16544; B41J 2/16508;
B41J 2/16523; B41J 2/16579; H02M 3/07
See application file for complete search history.

(56) References Cited

U.S. PATENT DOCUMENTS

| | | | |
|---|---|---|---|
| 2004/0155913 A1* | 8/2004 | Kosugi .............. | G03G 15/0851 347/19 |
| 2020/0079079 A1 | 3/2020 | Adachi et al. | |
| 2023/0087301 A1 | 3/2023 | Tanaka et al. | |

FOREIGN PATENT DOCUMENTS

| | | | |
|---|---|---|---|
| JP | 2020040288 A | 3/2020 | |
| JP | 2023044417 A | 3/2023 | |

* cited by examiner

FIG. 1

CONVEYING
DIRECTION

LEFT SIDE ← SCANNING → RIGHT SIDE
DIRECTION

VERTICAL
DIRECTION

LEFT SIDE ◄————————► RIGHT SIDE
SCANNING
DIRECTION

FIG. 4

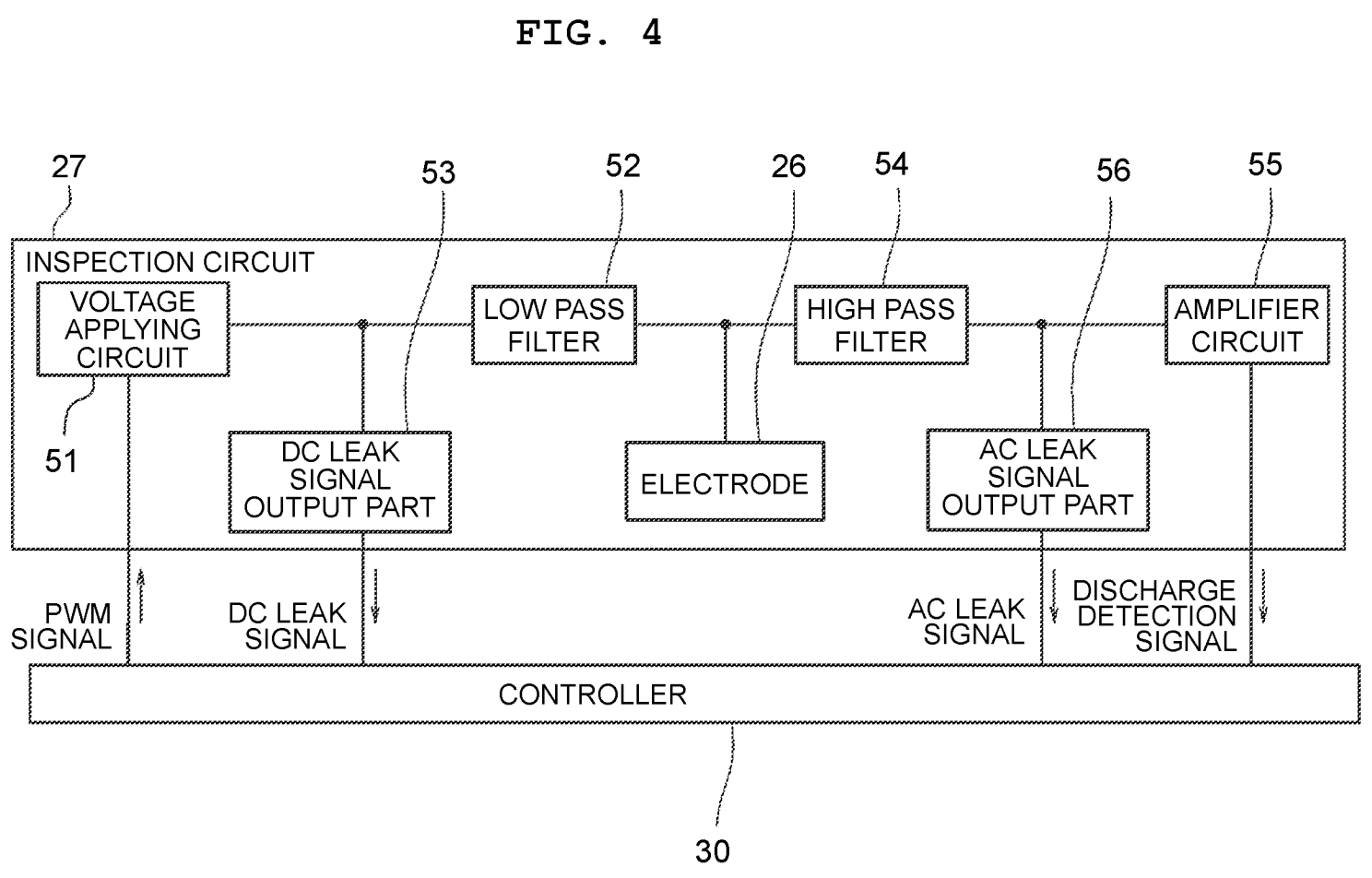

INSPECTION CIRCUIT

27

51 VOLTAGE APPLYING CIRCUIT

53 DC LEAK SIGNAL OUTPUT PART

52 LOW PASS FILTER

26 ELECTRODE

54 HIGH PASS FILTER

56 AC LEAK SIGNAL OUTPUT PART

55 AMPLIFIER CIRCUIT

PWM SIGNAL

DC LEAK SIGNAL

AC LEAK SIGNAL

DISCHARGE DETECTION SIGNAL

CONTROLLER

Figure 8:
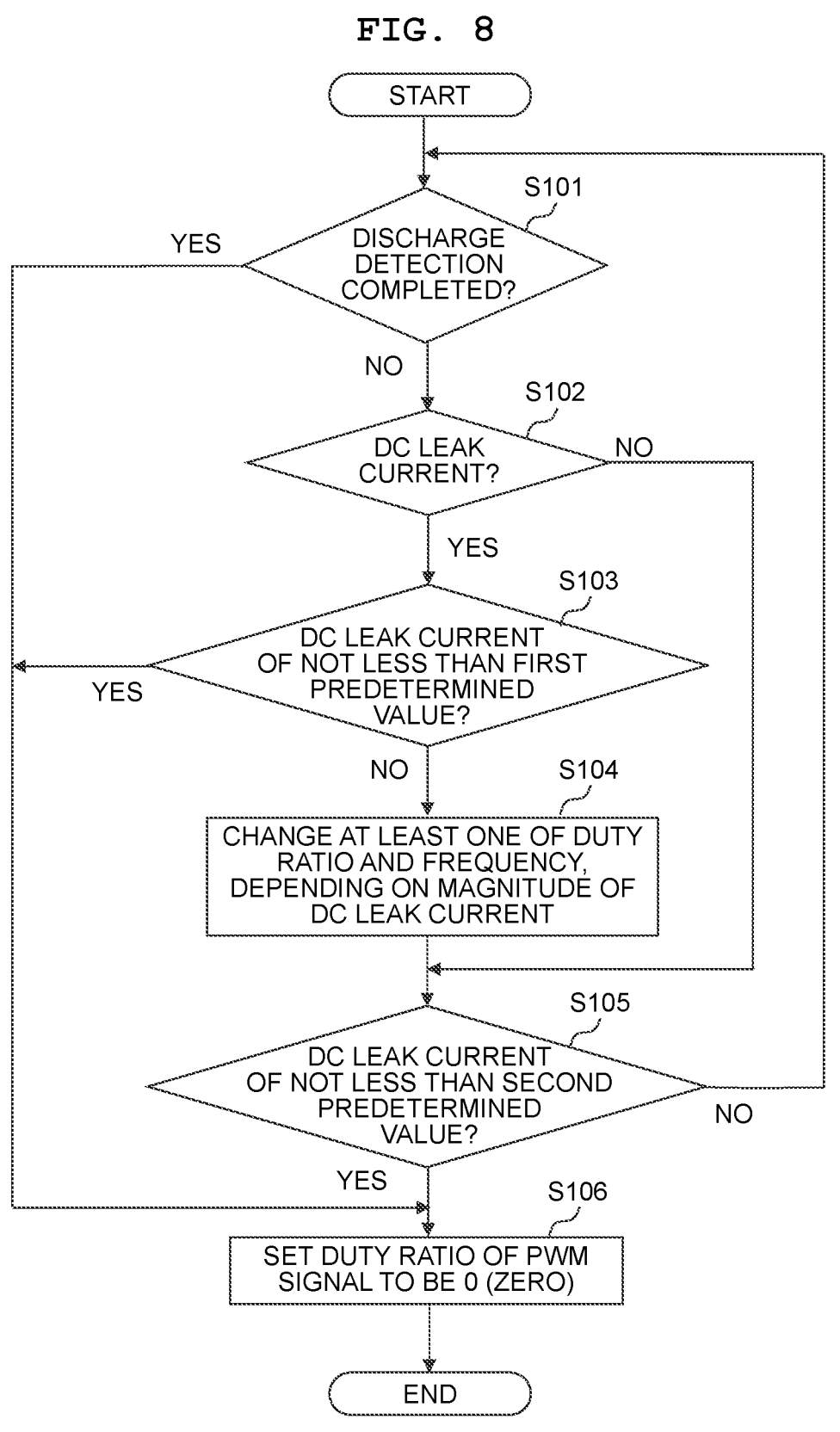

START

S101

YES ← DISCHARGE DETECTION COMPLETED?

NO

S102

DC LEAK CURRENT? → NO

YES

S103

YES ← DC LEAK CURRENT OF NOT LESS THAN FIRST PREDETERMINED VALUE?

NO

S104

CHANGE AT LEAST ONE OF DUTY RATIO AND FREQUENCY, DEPENDING ON MAGNITUDE OF DC LEAK CURRENT

S105

DC LEAK CURRENT OF NOT LESS THAN SECOND PREDETERMINED VALUE? → NO

YES

S106

SET DUTY RATIO OF PWM SIGNAL TO BE 0 (ZERO)

END

FIG. 12

LIQUID EJECTING APPARATUS

REFERENCE TO RELATED APPLICATIONS

This application claims priority from Japanese Patent Application No. 2022-192784 filed on Dec. 1, 2022. The entire content of the priority application is incorporated herein by reference.

BACKGROUND ART

As an example of a liquid ejecting apparatus which ejects a liquid from nozzles, there is a known ink-jet printer which ejects an ink from nozzles so as to perform recording. In the known ink-jet printer, a capping member covering the nozzles is provided with an inspection area which includes an electrode member. Further, the voltage of an electric wiring, which is several volts, drawn or routed in the inside of the ink-jet printer is boosted to a voltage in a range from tens to hundreds of volts via a voltage boosting circuit, and the boosted voltage is applied to a cavity plate constructing a printing head. With this, a voltage difference is generated between the printing head and the inspection area. Furthermore, in this state, an inspection as to whether or not the ink is ejected normally from the nozzles is performed, based on a change in the voltage in the inspection area in a case that an operation of causing a print head to eject the ink from the nozzles toward the inspection area is performed.

SUMMARY

Here, in the known ink-jet printer, it is necessary to boost the voltage greatly by the voltage boosting circuit. The voltage boosting circuit configured to greatly boost the voltage is considered to be constructed, for example, by using a transformer. However, in a case that the voltage boosting circuit is formed by using the transformer, the size of the voltage boosting circuit becomes great since the transformer has a large size.

An object of the present disclosure is to provide a technique contributing to making a circuit, which is configured to boost the voltage to be applied to a liquid ejecting head or to an electrode in a case of inspecting whether or not a nozzle has any abnormality, to be small.

According to an aspect of the present disclosure, a liquid ejecting apparatus includes a liquid ejecting head, a signal output part and a voltage applying circuit. The liquid ejecting head includes a nozzle and is configured to eject a liquid from the nozzle. The signal output part includes an electrode and is configured to output a signal in accordance with an electric change in the electrode in a case that the liquid is ejected from the nozzle. The voltage applying circuit includes a plurality of charge pumps. Each of the plurality of charge pumps includes a capacitor and a diode, and is configured to boost a voltage. The plurality of charge pumps are connected in series. The voltage applying circuit is configured to apply the voltage boosted by the plurality of charge pumps to the liquid ejecting head or to the electrode so that a potential difference between the liquid ejecting head and the electrode is generated.

According to another aspect of the present disclosure, a liquid ejecting apparatus includes a liquid ejecting head, a signal output part and a voltage applying circuit. The liquid ejecting head includes a nozzle and is configured to eject a liquid from the nozzle. The signal output part includes an electrode and is configured to output a signal in accordance with an electric change in the electrode in a case that the liquid is ejected from the nozzle. The voltage applying circuit includes a charge pump which includes a capacitor and a diode and which is configured to boost a voltage; and the voltage applying circuit is configured to apply the voltage boosted by the charge pump to the liquid ejecting head or to the electrode so that a potential difference between the liquid ejecting head and the electrode is generated.

According to the present disclosure, the voltage applying circuit including the charge pump or pumps enables downsizing of a circuit board including a substrate and electronic components for boosting voltage to be applied to the inspection circuit further than a voltage applying circuit with a transformer. Specifically, by using the charge pumps instead of a transformer, the area of the board can be reduced. Further, the charge pump including the capacitor and the diode protrudes from the circuit board by a smaller amount than the transformer.

BRIEF DESCRIPTION OF DRAWINGS

FIG. 1 is a view schematically depicting the configuration of a printer 1.

FIG. 4 is a diagram depicting the configuration of a circuit for inspection (an inspection circuit) of FIG. 3.

FIG. 8 is a flow chart indicating the flow of a processing for controlling the PWM signal.

FIG. 12 is a view for explaining an example of switching regarding outputting, from a voltage output part, an output voltage from which one of charge pumps.

DESCRIPTION

Overall Configuration of Printer

Figure 1:
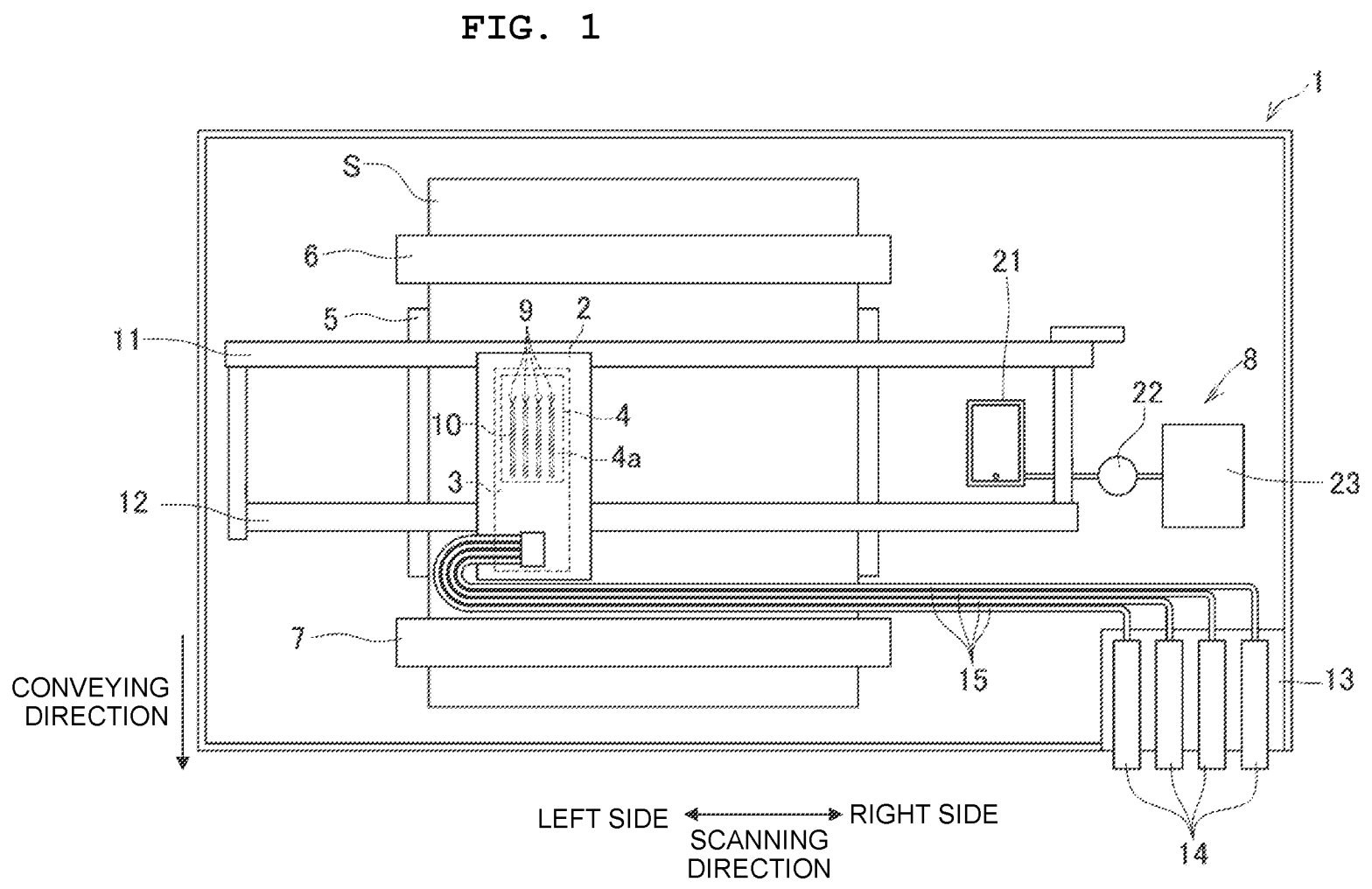
Figure 2:
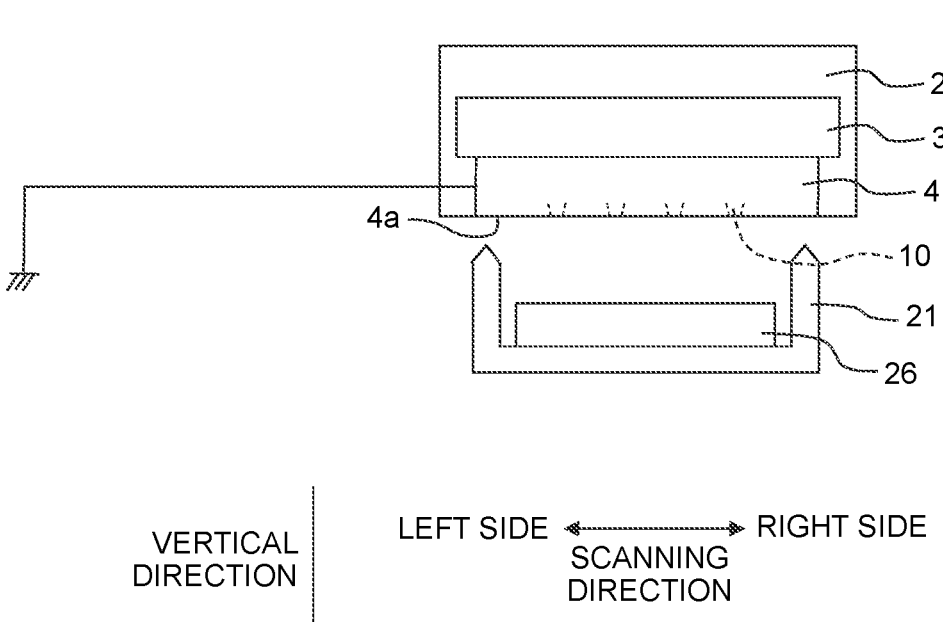
FIG. 2 is a view for explaining an electrode, etc., arranged inside a cap.

As depicted in FIG. 1, a printer 1 according to the present embodiment includes a carriage 2, a sub tank 3, an ink-jet head 4, a platen 5, conveying rollers 6 and 7, a maintenance unit 8, etc. Note that in the present embodiment, the printer 1 corresponds to a "liquid ejecting apparatus" of the present disclosure, and the ink-jet head 4 corresponds to a "liquid ejecting head" of the present disclosure.

The carriage 2 is supported by two guide rails 11 and 12 extending in a scanning direction. The carriage 2 is connected to a carriage motor 36 (see FIG. 3) via a non-illustrate belt, etc.; in a case that the carriage motor 36 is driven, the carriage 2 moves in the scanning direction along the guide rails 11 and 12. Note that in the following description, the explanation will be given, with the right side and the left side in the scanning direction being defined as depicted in FIG. 1.

The sub tank 3 is mounted on the carriage 2. Here, the printer 1 includes a cartridge holder 13, and four ink cartridges 14 are installed in the cartridge holder 13 to be attachable and detachable with respect to the cartridge holder 13. The four ink cartridges 14 are arranged side by side in the scanning direction, and store a black ink, a yellow ink, a cyan ink and a magenta ink, respectively, in this order from an ink cartridge 14 included in the four ink cartridges 14 and arranged on the rightmost side in the scanning direction. In the present embodiment, each of the inks corresponds to a "liquid" of the present disclosure. The sub tank 3 is connected to the four ink cartridges 14, which are installed in the cartridge holder 13, via four tubes 15, respectively. With this, the above-described four color inks are supplied from the four ink cartridges 14, respectively, to the sub tank 3.

The ink-jet head 4 is installed in the carriage 2, and is connected to a lower end part of the sub tank 3. The four color inks are supplied from the sub tank 3 to the ink-jet head 4. Further, the ink-jet head 4 ejects or ejects the inks from a plurality of nozzles 10 formed in a nozzle surface 4a which is the lower surface of the ink-jet head 4. To provide a more specific explanation, the plurality of nozzles 10 form nozzle rows 9 aligned in a conveying direction orthogonal to the scanning direction; four nozzle rows 9 are arranged side by side in the scanning direction in the nozzle surface 4a. The black, yellow, cyan, and magenta inks are ejected from the plurality of nozzles 10, in an order from nozzles 10, of the plurality of nozzles 10, which construct a nozzle row 9 which is included in the four nozzle rows 9 and which is located on the rightmost side in the scanning direction.

The platen 5 is arranged at a location below the ink-jet head 4, and is opposite to the plurality of nozzles 10. The platen 5 extends over the entire length of a recording sheet S in the scanning direction, and supports the recording sheet S from therebelow. The conveying roller 6 is arranged at the upstream side in the conveying direction with respect to the ink-jet head 4 and the platen 5. The conveying roller 7 is arranged at the downstream side in the conveying direction with respect to the ink-jet head 4 and the platen 5. The conveying rollers 6 and 7 are connected to a conveying motor 37 (see FIG. 3) via a non-illustrated gear, etc. In a case that the conveying motor 37 is driven, the conveying rollers 6 and 7 are rotated to thereby convey the recording sheet S in the conveying direction.

Further, in the printer 1, it is possible to perform a recording on the recording sheet S, by a controller 30 (see FIG. 3, to be described later on), by alternately executing a recording pass of causing the ink-jet head 4 to eject the ink(s) from the plurality of nozzles 10 toward the recording sheet S while controlling the carriage motor 36 so as to move the carriage 2 in the scanning direction, and a conveying operation of controlling the conveying motor 37 so as to cause the conveying rollers 6 and 7 to convey the recording sheet S.

The maintenance unit 8 includes a cap 21, a suction pump 22 and a waste liquid tank 23. The cap 21 is arranged at the right side in the scanning direction with respect to the platen 5. Further, in a case that the carriage 2 is positioned in a maintenance position which is on the right side in the scanning direction with respect to the platen 5, the plurality of nozzles 10 face or are opposite to the cap 21.

Figure 3:
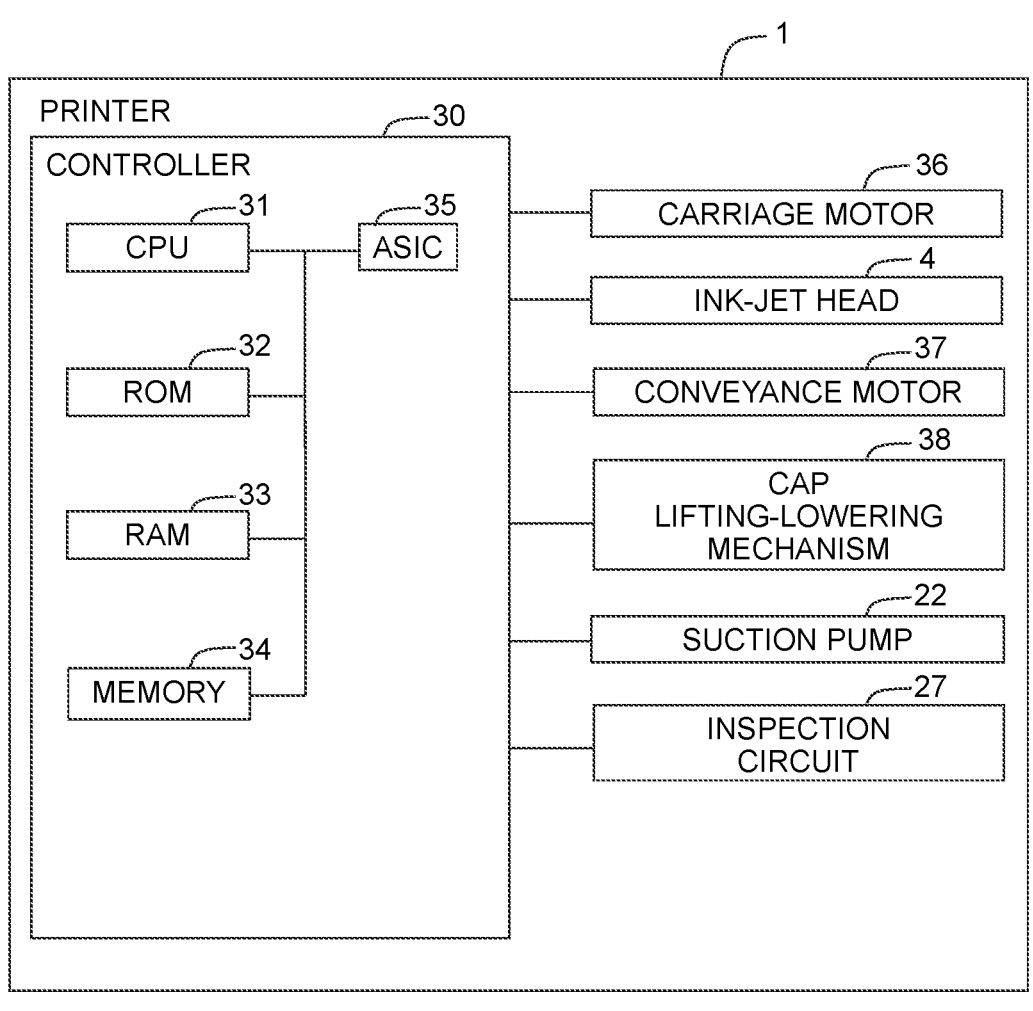
FIG. 3 is a block diagram depicting the electrical configuration of the printer 1.

Further, the cap 21 is movable upward and downward by a cap lifting-lowering mechanism 38 (see FIG. 3). Further, in a case that the cap 21 is moved upward by the cap lifting-lowering mechanism 38 in a state that the cap 2 is positioned in the maintenance position to thereby cause the plurality of nozzles 10 to face the cap 21, an upper end part of the cap 21 makes tight contact with the nozzle surface 4a, thereby providing a cap state in which the plurality of nozzles 10 are covered by the cap 21. Further, in a state that the cap 21 is lowered by the cap lifting-lowering mechanism 38, there is provided an uncap state in which the plurality of nozzles 10 are not covered by the cap 21. Note that the cap 21 is not limited to or restricted by being such a cap that makes tight contact with the nozzle surface 4a to thereby cover the plurality of nozzles 10. The cap 21 may be, for example, such a cap that makes tight contact with a non-illustrated frame, etc., which is arranged in the surrounding of the nozzle surface 4a of the ink-jet head 4 to thereby cover the plurality of nozzles 10.

The suction pump 22 is, for example, a tube pump, etc., and is connected to the cap 21 and the waste liquid tank 23. Further, in the maintenance unit 8, in a case that the suction pump 22 is driven in the above-described cap state, it is possible to perform a so-called suction purge of discharging the ink inside the ink-jet head 4 from the plurality of nozzles 10. The ink discharged by the suction purge is stored in the waste liquid tank 23.

Note that the explanation is given herein, for the sake of convenience, that the cap 21 is configured to cover all the plurality of nozzles 10 together and that the inks inside the ink-jet head 4 are discharged from all the plurality of nozzles 10 in the suction purge. The present disclosure, however, is not limited to or restricted by this. For example, it is allowable to provide such a configuration that the cap 21 includes, separately, a part covering nozzles 10, among the plurality of nozzles 10, constructing the rightmost nozzle row 9 included in the four nozzle rows 9 and ejecting the blank ink, and another part covering nozzles 10, among the plurality of nozzles 10, constructing three nozzle rows 9 on the left side among the four nozzle rows 9 and ejecting the color inks, namely, the yellow, cyan and magenta inks. Further, in the suction purge, it is allowable to selectively eject either one of the black ink and the color inks in the inside of the ink-jet head 4. Alternatively, for example, it is allowable to provide the cap 21 as a plurality of caps each of which is provided individually on one of the four nozzle rows 9. Further, it is allowable that, in the suction purge, each of the four color inks is discharged individually from one of the four nozzles rows 9.

Further, as depicted in FIG. 2, an electrode 26 having a rectangular planar shape is arranged in the inside of the cap 21. The electrode 26 constructs a circuit for inspection (inspection circuit) 27 (see FIGS. 3 and 4; which will be described later on). The inspection circuit 27 is controlled by the controller 30 (see FIGS. 3 and 4). Furthermore, in the present embodiment, it is possible to determine whether or not the ink is ejected normally from the nozzles 10, based on an ejection detection signal, which is output from an amplifier circuit 55 (to be described later on) of the inspection circuit 27, in accordance with a change in the voltage in the electrode 26 in a case that an ejection driving for causing the ink-jet head 4 to eject the ink(s) from the nozzle(s) 10 is performed in a state that the cap state is provided and that a potential difference is generated between the ink-jet head 4 and the electrode 26, as will be described later on. Note that the inspection circuit 27 corresponds to a "signal output part" of the present disclosure.

Electric Configuration of Printer

Next, the electric configuration of the printer 1 will be explained. As depicted in FIG. 3, the printer 1 includes the controller 30. The controller 30 is constructed, for example, of a CPU 31, a ROM 32, a RAM 33, a memory 34, an ASIC 35, etc. Here, the CPU represents a "Central Processing Unit", the ROM means a "Read Only Memory", the RAM is an abbreviation of "Random Access Memory and the ASIC is an abbreviation of "Application Specific Integrated Circuit". The controller 30 controls the operation of each of the carriage motor 36, the ink-jet head 4, the conveying motor 37, the cap lifting-lowering mechanism 38, the suction pump 22, the inspection circuit 27, etc. Further, the controller 30 receives a signal from the inspection circuit 27.

Note that the controller 30 may be configured such that only the CPU 31 performs the various kinds of processing or that only the ASIC 35 performs the various kinds of processing, or that the CPU 31 and the ASIC 35 perform the various kinds of processing in a cooperative manner. Alternatively, the controller 30 may be configured such that one CPU 31 singly performs the processing, or that a plurality of CPUs 31 performs the processing in a sharing manner. Still alternatively, the controller 30 may be configured such that one ASIC 35 singly performs the processing, or that a plurality of ASICs 35 performs the processing in a sharing manner.

Inspection Circuit

Next, the inspection circuit 27 will be explained. As depicted in FIG. 4, the inspection circuit 27 includes the above-described electrode 26, a voltage applying circuit 51, a low pass filter 52, a DC leak signal output part 53, a high pass filter 54, an amplifier circuit 55 and an AC leak signal output part 56.

The voltage applying circuit 51 is a circuit configured to apply a voltage to the electrode 26. The voltage applying circuit 51 boosts a voltage input thereto and outputs the boosted voltage therefrom, thereby applying the voltage to the electrode 26. The configuration and the operation of the voltage applying circuit 51 will be explained in detail later on.

The voltage applying circuit 51 and the electrode 26 are connected via the low pass filter 52. The low pass filer 52 is a filter configured to gradually decrease a component of a frequency higher than a cut-off frequency in a voltage variation in the electrode 26 and to perform output with the above-described component having been gradually decreased, to the side of the voltage applying circuit 51. Namely, mainly a direct current component of the voltage of the electrode 26 is output to the side of the voltage applying circuit 51 via the low pass filter 52.

The DC leak signal output part 53 is connected to a wiring branched from a wiring connecting the voltage applying circuit 51 and the low pass filter 52. Here, in the printer 1, there is such a case, for example, that the electrode 26 and the ink-jet head 4 are conducted via an ink adhered to the cap 21 during the suction purge, which in turn causes a leak current of direct current (DC leak current) to flow between the electrode 26 and the ink-jet head 4, in some cases. In a case that the DC leak current flows between the electrode 26 and the ink-jet head 4, the voltage of the electrode 26 is lowered. Further, as the magnitude of the DC leak current is greater, a lowering amount by which the voltage of the electrode 26 is lowered becomes greater. The DC signal output part 53 outputs, to the controller 30, a DC leak signal indicating whether or not the DC leak current flows between the electrode 26 and the ink-jet head 4, and indicating the magnitude of the DC leak current, based on the direct current component of the voltage, of the electrode 26, which is input via the above-described low pass filter 52. Note that in the present embodiment, a combination of the low pass filter 52 and the DC leak signal output part 53 corresponds to a "first leak detecting circuit" of the present disclosure.

The high pass filter 54 is connected to a wiring branched from a wiring connecting the electrode 26 and the low pass filter 52. The amplifier circuit 55 is connected to the high pass filter 54.

The high pass filter 54 is a filter gradually decrease the direct current component of the voltage of the electrode 26, namely, a high voltage component of the voltage of the electrode 26. With this, in a case that the voltage variation occurs in the electrode 26, the change in the voltage of the electrode 26 is output to the side of the amplifier circuit 55, with the high voltage component having been removed in the high pass filter 54. The voltage output from the high pass filter 54 to the amplifier circuit 55 is amplified in the amplifier circuit 55 and is output, as the ejection detection signal, to the controller 30.

Here, an explanation will be given about the change in the voltage of the electrode 26 in a case of causing the ink-jet head 4 to perform the ejection driving, while the above-described cap state and a state that the potential difference is caused to occur between the ink-jet head 4 and the electrode 26 by applying the voltage by the voltage applying circuit 51 to the electrode 26 are provided. In a case that the ink is not ejected from the nozzles 10 by the ejection driving, the voltage of the electrode 26 hardly changes. In a case that the ink is ejected from the nozzles 10 by the ejection driving, the voltage of the electrode 26 changes. Further, the change of the voltage of the electrode 26 in this situation is abrupt. Accordingly, the high frequency component of the voltage of the electrode 26 becomes different, depending on whether or not the ink is ejected from the nozzle 10.

Figure 5A:
FIG. 5A is a view for explaining a signal output from a high pass filter toward an amplifier circuit in a case that an ink is not ejected from a nozzle in an ejection driving.

With this, in a case that the ink is not ejected from the nozzles 10 by the ejection driving, each of the signal output from the high pass filter 54 toward the amplifier circuit 55 and the ejection detection signal amplified by and output from the amplifier circuit 55 is a signal of which voltage hardly changes from a voltage V0, as depicted in FIG. 5A. Here, the voltage V0 is, for example, a voltage close to the ground voltage.

Figure 5B:
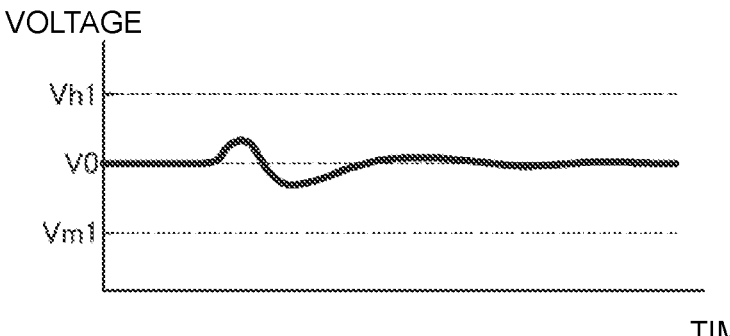
FIG. 5B is a view for explaining a signal output from the high pass filter toward the amplifier circuit in a case that the ink is ejected from the nozzle in the inspecting driving.

On the other hand, in a case that the ink is ejected from the nozzles 10 by the ejection driving and that the voltage of the electrode 26 changes, the signal output from the high pass filter 54 toward the amplifier circuit 55 is a signal of which voltage changes with respect to the voltage V0, as depicted in FIG. 5B. Note that, however, an amount of change in the voltage (voltage change amount) of the electrode 26 in the case that the ink is ejected from the nozzles 10 by the ejection driving is small as compared with a voltage change amount of the voltage of the electrode 26 in a case that a leak current of alternate current (AC leak current) flows between the ink-jet head 4 and the electrode 26, as will be described later on. Accordingly, the signal output from the high pass filter 54 toward the amplifier circuit 55 in the case that the ink is ejected from the nozzles 10 by the ejection driving is also a signal of which voltage change amount is small, as depicted in FIG. 5B.

Figure 5C:
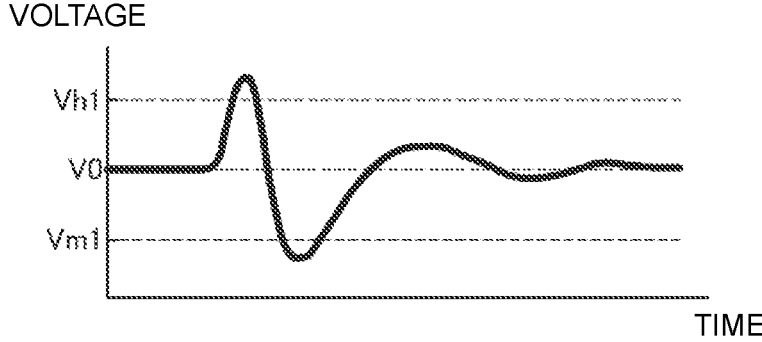
FIG. 5C is a view for explaining a ejection detection signal output from the amplifier circuit in the case that the ink is ejected from the nozzle in the inspecting driving.

Further, the ejection detection signal output from the amplifier circuit 55 is a signal obtained by amplifying the signal of FIG. 5B, as depicted in FIG. 5C. Accordingly, the ejection detection signal output from the amplifier circuit 55 is a signal in which the change in the voltage is greater than that in the signal output from the high pass filter 54 toward the amplifier circuit 55. For example, the ejection detection signal in a case that the ink is ejected from the nozzles 10 by the ejection driving is such a signal wherein a maximum value is greater than Vh1 (Vh1>V0) and a minimum value is smaller than Vm1 (Vm1<V0).

In such a manner, the ejection detection signal is the signal indicating whether or not the ink is ejected from the nozzles 10 by the ejection driving. Further, since the ejection detection signal is the signal amplified by the amplifier circuit 55, this signal is a signal in which the voltage change amount in the case that the ink is ejected from the nozzles 10 by the ejection driving is great to some extent.

The AC leak signal output part 56 is connected to a wiring branched from a wiring connecting the high pass filter 54 and the amplifier circuit 55. Here, in the printer 1, there is such a case, for example, that the electrode 26 and the ink-jet head 4 are temporarily conducted via the ink adhered to the cap 21 during the suction purge, which in turn causes a leak current of alternative current (AC leak current) to flow between the electrode 26 and the ink-jet head 4, in some cases. In a case that the AC leak current flows between the electrode 26 and the ink-jet head 4, the voltage of the electrode 26 changes, and the voltage output from the high pass filter 54 toward the amplifying circuit 55 also changes. This change in the voltage is greater than the change in the voltage output from the high pass filter 54 toward the amplifier circuit 55 in the case that the ink is ejected from the nozzles 10 by the above-described ejection driving. The AC signal output part 56 outputs, to the controller 30, an AC leak signal indicating whether or not the AC leak current of not less than a second predetermined value flows between the electrode 26 and the ink-jet head 4, in accordance with the voltage output from the high pass filter 54 toward the amplifier circuit 55. Note that in the present embodiment, a combination of the high pass filter 54 and the AC leak signal output part 56 corresponds to a "second leak detecting circuit" of the present disclosure.

Voltage Applying Circuit

Figures 6A, 6B:
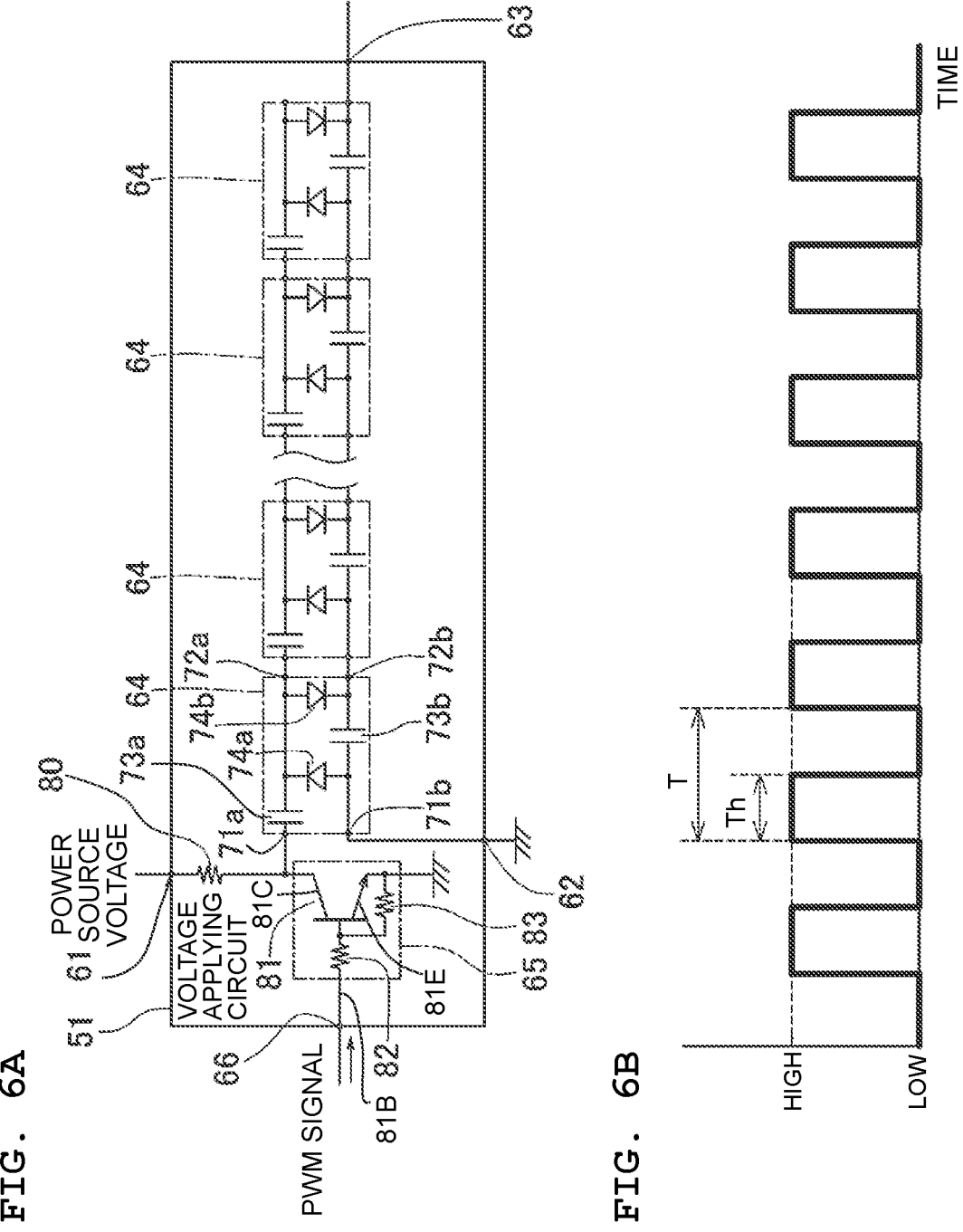
FIG. 6A is a view depicting a configuration of a voltage applying circuit of FIG. 4
FIG. 6B is a view for explaining the PWM signal.

Next, the configuration of the voltage applying circuit 51 will be explained. As depicted in FIG. 6A, the voltage applying circuit 51 includes a first voltage input part 61, a second voltage input part 62, a voltage output part 63, not less than 10 charge pumps 64 connected in series, a switching element 65 and a PWM signal input part 66.

The first voltage input part 61 is connected to a non-illustrated power source circuit of the printer 1, and a power source voltage is input to the first voltage input part 61. The power source voltage is a voltage of 50V or less. The second voltage input part 62 is maintained at the ground potential. The voltage output part 63 is a part to which a voltage to be applied to the electrode 26 is input, and is connected to the electrode 26 (see FIG. 4) via the low pass filter 52 (see FIG. 4).

Each of the plurality of charge pumps 64 has input parts 71a and 71b, output parts 72a and 72b, capacitors 73a and 73b and diodes 74a and 74b.

Among the plurality of charge pumps 64, in a leftmost charge pump 64 in FIG. 6A, the input part 71a is connected to the first voltage input part 61 via a resistor 80, and the input part 71b is connected to the second voltage input part 62. Among the plurality of charge pumps 64, in each of the charge pumps 64 except for the leftmost charge pump 64 in FIG. 6A, the input part 71a is connected to the output part 72a of another charge pump 64 adjacent thereto on the left side of FIG. 6A, and the input part 71b is connected to the output part 72b of the another charge pump 64 adjacent thereto on the left side of FIG. 6A. Among the plurality of charge pumps 64, in a charge pump 64 on the rightmost side in FIG. 6A, the output part 72b is connected to the voltage output part 63. Among the charge pumps 64, the output part 72a of a rightmost charge pump 64 is not connected to any other circuit, etc. Note that in the following explanation, for the sake of convenience, although the output part 72a of the rightmost charge pump 64 in FIG. 6A is illustrated, it is allowable that the rightmost charge pump 64 does not have a part corresponding to the output part 72a and configured to perform a connected with respect to another circuit(s), etc.

Each of the capacitors 73a and 73b is a ceramic capacitor. The capacitor 73a is connected between the input part 71a and the output part 72a. The capacitor 73b is connected between the input part 71b and the output part 72b. The cathode of the diode 74a is connected between the capacitor 73a and the output part 72a. The anode of the diode 74a is connected between the input part 71b and the capacitor 73b. The cathode of the diode 74b is connected between capacitor 73b and the output part 72b. The anode of the diode 74b is connected between the capacitor 73a and the output part 72a.

The switching element 65 has a transistor 81 and resistors 82 and 83. The transistor 81 is a transistor of a NPN type. A collector 81C of the transistor 81 is connected to the first voltage input part 61 via the resistor 80. A base 81B of the transistor 81 is connected to the PWM signal input part 66 via the resistor 82. An emitter 81E of the transistor 81 is maintained at the ground potential. Further, the base 81B and the emitter 81E of the transistor 81 are connected via the resistor 83.

A PWM signal which is a pulse signal as depicted in FIG. 6B is input from the controller 30 to the PWM signal input part 66. In a case that the PWM signal is of a HIGH level, the transistor 81 is turned ON, and the collector 81C and the emitter 81E of the transistor 81 are conducted with each other. In a case that the PWM signal is of a LOW level, the transistor 81 is turned OFF, and the collector 81C and the emitter 81E of the transistor 81 are insulated from each other. Here, the controller 30 is capable of changing a duty ratio as a ratio (Th/T) of a period Th of the HIGH level with respect to a frequency T of the PWM signal, and a frequency (1/T) of the PWM signal.

Note that the switching element 65 is not limited to being a switching element having the transistor 81 of the NPN type. The switching element 65 may be a switching element having another transistor, different from the transistor 81 of the NPN type, such as a transistor of the PNP type, a MOS-FET, etc., capable of being switched ON and OFF by the PWM signal.

Operation of Voltage Applying Circuit

Next, an operation of the voltage applying circuit 51 will be explained. In the voltage applying circuit 51, in a case that the PWM signal is input to the PWM signal input part 66, the voltage input to the voltage input parts 61 and 62 is boosted by the plurality of charge pumps 64. Further, the boosted voltage is output from the voltage output part 63.

Figure 7A:
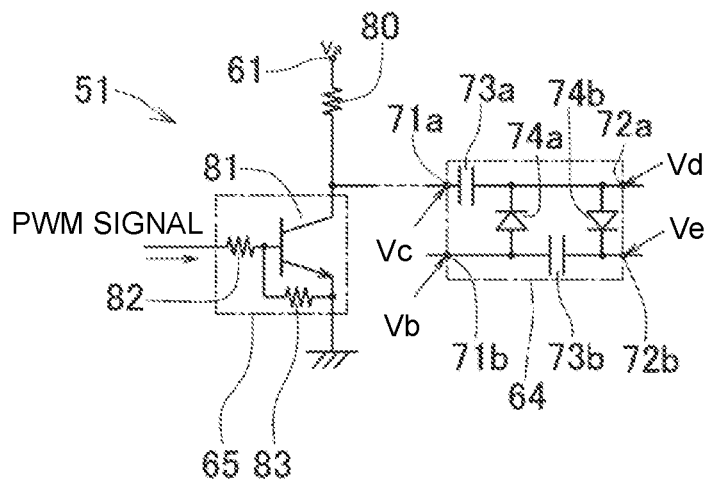
FIG. 7A is a view for explaining voltage boost in a certain charge pump 64.

The voltage boost in each of the plurality of charge pumps 64 will be explained. Here, as depicted in FIG. 7A, provided that a voltage input to the first voltage input part 61 is "Va", a voltage input to the input part 71b of a certain charge pump 64, among the plurality of charge pumps 64, is "Vb", a voltage input to the input part 71a of the certain charge pump 64 is "Vc", a voltage output from the output part 72a of the certain charge pump 64 is "Vd", and a voltage output from the output part 72b of the certain charge pump 64 is "Ve".

Figure 7B:
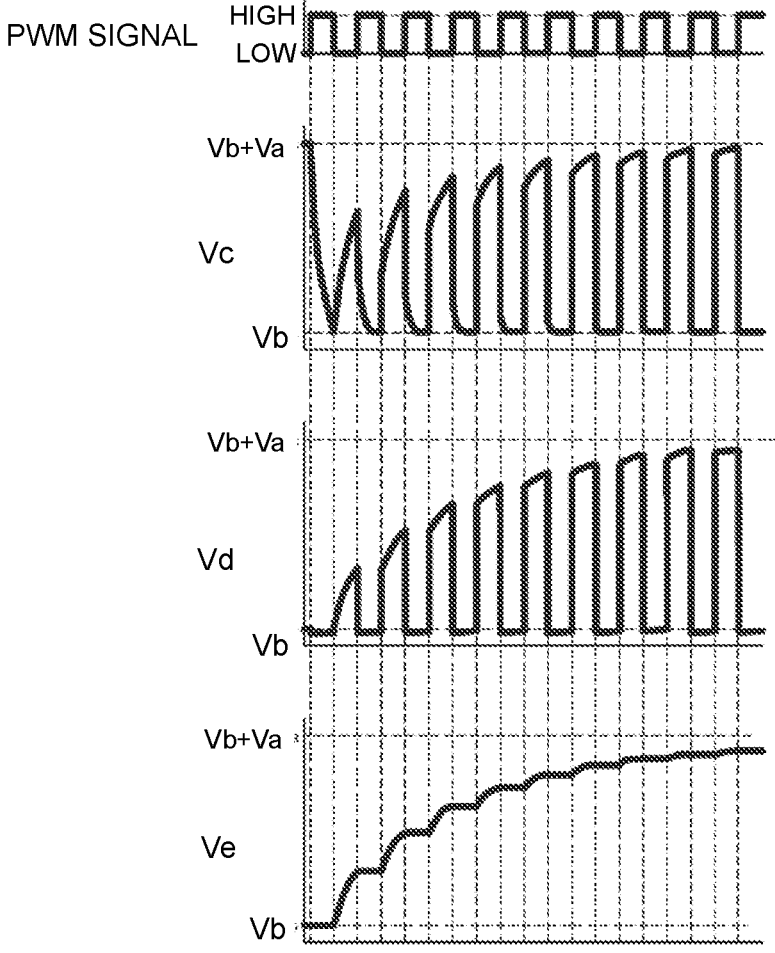
FIG. 7B is a view depicting an example of change of each of voltages Vc, Vd and Ve with respect to a change in a PWM signal.

In this case, as depicted in FIG. 7B, in a case that the HIGH and LOW of the PWM signal input to the PWM signal input part 66 is switched repeatedly, a state of the electric charge to the capacitors 73a and 73b and a state of the electric discharge from the capacitors 73a and 73b are switched. Further, in a case that the PWM signal is switched from HIGH to LOW, the voltages Vc, Vd and Ve are raised (boosted). In a case that the PWM signal is switched from LOW to HIGH, the voltages Vc and Vd are lowered. On the other hand, since the diode 74b is connected, in the case that the PWM signal is switched from LOW to HIGH and that the voltage Vd is lowered, the voltage Ve is not lowered and is maintained to be substantially constant.

With this, in the case that HIGH and LOW of the PWM signal is repeatedly switched, the voltages Vc and Vd are repeatedly subjected to the voltage raising (boost) and the voltage lowering, which in turn cause the voltages Vc and Ve, in a case that the voltages Vc and Vd are subject to the voltage boost, are gradually raised. On the other hand, in the case that HIGH and LOW of the PWM signal is repeatedly switched, the voltage Ve is repeatedly subjected to the voltage raising (boost) and the voltage maintaining, which in turn cause the voltage Ve to be gradually raised. Although the final voltage Ve changes depending on the duty ratio of the PWM signal, the maximum value of the final voltage Ve is approximately (Vb+Va). More strictly, the maximum value of the final voltage Ve is a voltage which is lower than (Vb+Va) by an extent of lowering in the voltages in the diodes 74a and 74b.

In such a manner, in one charge pump 64, it is possible to boost the voltage Vb input to the input part 71b approximately up to a maximum of (Vb+Va) and to output the boosted voltage from the output part 72b. Accordingly, for example, in a case that the voltage applying circuit 51 has N charge pumps 64 and that the voltage Vb input to the input part 71b of a leftmost charge pump 64 in FIG. 6A is a voltage Vb1, the voltage output from the voltage output part 63 has the maximum value which is approximately (Vb1×N+Va), since the voltage is boosted approximately up to the voltage Va in each of the N charge pumps 64. In the present embodiment, since the voltage Vb1 is 0 (zero) V, the voltage output from the voltage output part 63 has the maximum value which is approximately (N+Va). Further, in the present embodiment, since the voltage applying circuit 51 has not less than 10 charge pumps 64, the power source voltage Va input to the first voltage input part 61 is consequently boosted by 10 or more times in the voltage applying circuit 51 by these charge pumps 64. Further, in the present embodiment, since the voltage Va input to the first voltage input part 61 and the voltage (ground voltage) input to the second voltage input part 62 are each 50V or less, and the voltage (approximately N×Va) output from the voltage output part 63 is not less than 300 V.

Processing for Adjusting Voltage

Next, an explanation will be given about a processing of adjusting the voltage to be applied to the electrode 26 by controlling the PWM signal. In the present embodiment, in order to adjust the voltage to be applied to the electrode 26, the controller 30 performs a processing along a flow chart of FIG. 8 to thereby control the PWM signal. The flow charge of FIG. 8 is started in a case that the voltage is started to be applied to the electrode 26 by the voltage applying circuit 51. The duty ratio and the frequency of the PWM signal in the case that the PWM signal is started to be applied to the electrode 26 by the voltage applying circuit 51 are a duty ratio and a frequency such that the voltage output from the voltage applying circuit 51 is a voltage lower than a voltage which can be maximally output (for example, the above-described "N×Va"). The this, by changing at least one of the duty ratio and the frequency of the PWM signal, the voltage output from the voltage applying circuit 51 can be either made high or low.

To provide a detailed explanation regarding the flow chart of FIG. 8, the controller 30 determines whether or not an ejection detection is completed (step S101). The term "ejection detection" means an operation, regarding each of the plurality of nozzles 10 of the ink-jet head 4, of causing the ink-jet head 4 to perform the ejection driving and of determining, based on the ejection detection signal output from the amplifier circuit 55 in this case, whether or not a ejecting state has any abnormality in each of the plurality of nozzles 10.

In a case that the ejection detection is not completed (step S101: NO), the controller 30 determines whether or not the DC leak current is detected, based on the DC leak signal output from the DC leak signal output part 53 (step S102). In a case that the DC leak current is not detected (step S102: NO), the controller 30 proceeds the processing to step S105. In a case that the DC leak current is detected (step S102: YES), the controller 30 determines whether or not the DC leak current of not less than the first predetermined value is detected, based on the DC leak signal (step S103).

In a case that the DC leak current of not less than the first predetermined value is not detected (step S103: NO), the controller 30 adjusts at least one of the duty ratio and the frequency of the PWM signal, based on the magnitude of the DC leak current, thereby making the voltage to be output from the voltage applying circuit 51 higher than the voltage to be output from the voltage applying circuit 51 in a case that the DC leak current is not detected (step S104), and proceeds the processing to step S105.

In a case that the DC leak current of not less than the first predetermined value is detected (step S103: YES), the controller 30 sets the duty ratio of the PWM signal to 0 (zero) (step S106), and ends the processing. In a case that the duty ratio of the PWM signal is set to 0 (zero), the voltage boost is not performed in the voltage applying circuit 51, and the application of the high voltage to the electrode 26 is stopped.

In step S105, the controller 30 determines, regarding the AC leak signal output from the AC leak signal output part 56, whether or not the AC leak current of not less than the second predetermined value is detected. In a case that the AC leak current of not less than second predetermined value is not detected (step S105: NO), the controller 30 returns the processing to step S101. In a case that the AC leak current of not less than second predetermined value is detected (step S105: YES), the controller 30 sets the duty ratio of the PWM signal to 0 (zero) (step S106), and ends the processing.

Note that in a case that the duty ratio of the PWM signal is set to 0 (zero) based on that the DC leak current of not less than the first predetermined value is detected, or that the AC leak current of not less than the second predetermined value is detected, the ejection detection is stopped or interrupted.

Further note that also in a case that the ejection detection is completed (step S101: YES), the controller 30 sets the duty ratio of the PWM signal to 0 (zero) (step S106) and ends the processing.

The Technical Effects of the Present Embodiment

In the present embodiment, the voltage applying circuit 51 is configured to perform the voltage boost by the plurality of charge pumps 64, and thus the circuit (the voltage applying circuit 51) enables downsizing of a circuit board including a substrate and electronic components for boosting voltage further than a voltage applying circuit configured to perform the voltage boost by using a transformer. Specifically, the voltage applying circuit 51 using the plurality of charge pumps 64 may have a smaller size of the circuit board (of the voltage applying circuit), than the voltage applying circuit using a transformer. Further, each charge pump 64 including the capacitors 73a and 73b and the diodes 74a and 74b can reduce the volumes of components on the circuit board than the transformer, thereby minimizing an amount protruding from the circuit board.

Further, in the present embodiment, the voltage applying circuit 51 boosts the voltage of 50V or less which has been input thereto up to the voltage of not less than 300V. Furthermore, in the present embodiment, the voltage applying circuit 51 boosts the input voltage by 10 or more times. Such a voltage applying circuit 51 with the plurality of charge pumps 64 effectively aids in downsizing of the entire circuit system.

Moreover, in the present embodiment, the voltage applying circuit 51 can greatly boost, by using not less than 10 charge pumps 64 connected in series, the voltage which is input to the voltage applying circuit 51.

Further, in the present embodiment, it is possible to adjust the voltage output from the voltage applying circuit 51 by changing at least one of the duty ratio and the frequency of the PWM signal which switches the ON and OFF of the switching element 65.

Furthermore, in a case of forming the voltage applying circuit 51 by using the plurality of charge pumps 64, as in the present embodiment, as the number of the charge pumps 64 which are connected in series is greater, the voltage output from the voltage applying circuit 51 becomes greater and the electric current output from the voltage applying circuit 51 becomes smaller. Accordingly, in the case of applying, to the electrode 26, the voltage by the voltage applying circuit 51 configured to greatly boost, with the plurality of charge pumps 64, the voltage input to the voltage applying circuit 51, the current flowing in the electrode 26 can be reduced to, for example, 100 μA or less, without additionally connecting a resistor, etc.

Moreover, in the present embodiment, the capacitors 73a and 73b of the charge pumps 64 are ceramic capacitors, thereby making it possible to make the voltage applying circuit 51 to be further small-sized. Note that the capacitors 73a and 73b may be a capacitor different from the ceramic capacitor, such as an electrolytic capacitor, and a tantalum capacitor. Also in this case, since the capacitors 73a and 73b are smaller than the transformer, it is possible to make the voltage applying circuit 51 smaller in size.

Further, in the present embodiment, even in a case that the leak current flows between the ink-jet head 4 and the electrode 26, it is possible to continue the ejection detection under a condition that the leak current is small. On the other hand, in a case that the DC leak current flows between the ink-jet head 4 and the electrode 26, a state that the voltage of the electrode 26 is lowered is continued. In view of this, in the present embodiment, the voltage output from the voltage applying circuit 51 is raised in accordance with the magnitude of the DC leak current indicated by the DC leak signal output from the DC leak signal output part 53. More specifically, the voltage output from the voltage applying circuit 51 is raised to such an extent that the lowering in the voltage in accordance with the leaked current is compensated. With this, it is possible to suppress the lowering in the voltage in the electrode 26 in the case that the leak current flows between the ink-jet head 4 and the electrode 26.

Furthermore, in the present embodiment, in a case that a large leak current flows between the ink-jet head 4 and the electrode 26, this might cause any failure or trouble in the printer 1. In view of this, in the case that the DC leak current of not less than the first predetermined value, or the AC leak current of not less than the second predetermined value, is detected, the duty ratio of the PWM signal is set to 0 (zero) so as to make any voltage boost is not performed in the voltage applying circuit 51, thereby stopping the application of high voltage to the electrode 26. This makes the printer 1 less susceptible to the failure.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modifications

In the foregoing, the embodiment of the present disclosure has been explained. The present disclosure, however, is not limited to the above-described embodiment. Various changes or modifications may be made to the present disclosure.

In the above-described embodiment, although at least one of the duty ratio and the frequency of the PWM signal is changed to hereby adjust the voltage output from the voltage applying circuit 51, the present disclosure is not limited to this.

Figure 9:
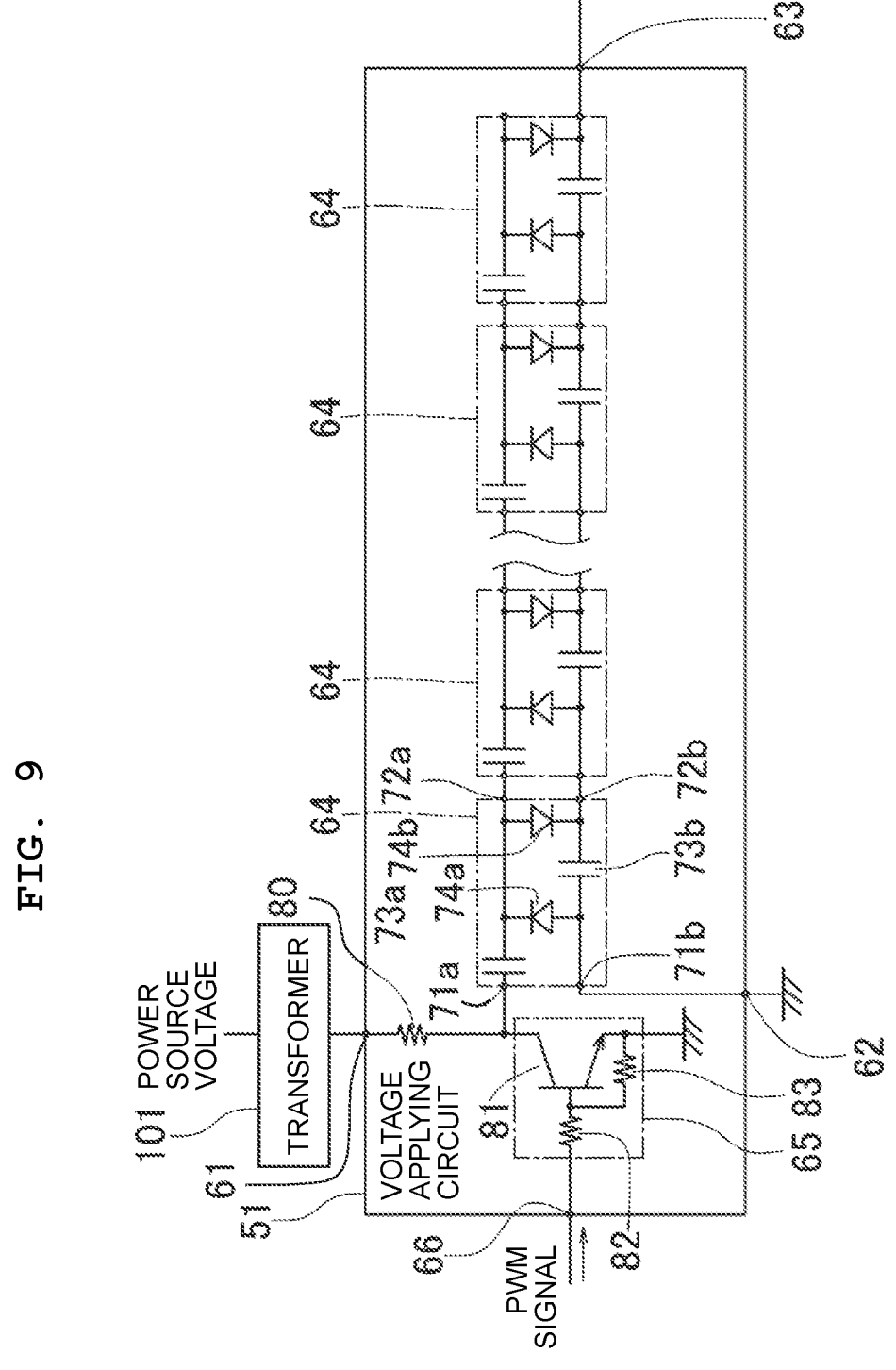
FIG. 9 is a view for explaining an example wherein a voltage to be input to a first voltage input part is adjusted by a transformer.

In a first modification, as depicted in FIG. 9, a transformer 101 is connected between the first voltage input part 61 of the voltage applying circuit 51 and a non-illustrated power source circuit. The transformer 101 boosts the voltage input thereto from the power source circuit and outputs the boosted voltage to the first voltage input part 61. Further, the transformer 101 is capable of changing a voltage boosting rate by which the voltage is boosted in this situation. Namely, in the first modification, it is possible to change the voltage to be input to the first voltage input part 61 by changing the voltage boosting rate in the transformer 101. Note that in the first modification, the transformer 101 corresponds to an "input voltage changing part" of the present disclosure.

Further, in the first modification, the controller 30 controls the transformer 101 so as to change the above-described voltage boosting rate in the transformer 101, thereby making it possible to adjust the voltage output from the voltage output part 63. To provide a more detailed explanation, in a case that the voltage boosting rate in the transformer 101 is set to be high, the voltage input to the first voltage input part 61 is raised. This increases a voltage boosting amount of the voltage in each of the plurality of charge pumps 64, which in turn leads to a higher voltage output from the voltage output part 63. On the other hand, in a case that the voltage boosting rate in the transformer 101 is set to be low, the voltage input to the first voltage input part 61 becomes low. This reduces the voltage boosting amount of the voltage in each of the plurality of charge pumps 64 which in turn leads to a lower voltage output from the voltage output part 63.

Note that the transformer 101 of the first modification is configured to boost the power source voltage to be the voltage to be input to the first voltage input part 61, and the voltage input to the first voltage input part 61 is lower than the voltage output from the voltage output part 63. Accordingly, the transformer 101 is small-sized, as compared with a transformer capable of boosting both the power source voltage and the voltage which is to be output from the voltage output part 63. Thus, in the first modification, the circuit is not made to be drastically great by the transformer 101.

Further, in the first modification, it is allowable to adjust the voltage output from the voltage output part 63 by changing the voltage boosting rate in the transformer 101, and by changing at least one of the duty ratio and the frequency of the PWM signal to be input to the PWM signal input part 66, in a similar manner in the above-described embodiment.

Alternatively, in the first modification, since the output voltage from the voltage output part 63 can be adjusted by the transformer 101, it is allowable to make the duty ratio and the frequency of the PWM signal to be input to the PWM signal input part 66 to be constant.

Figure 10:
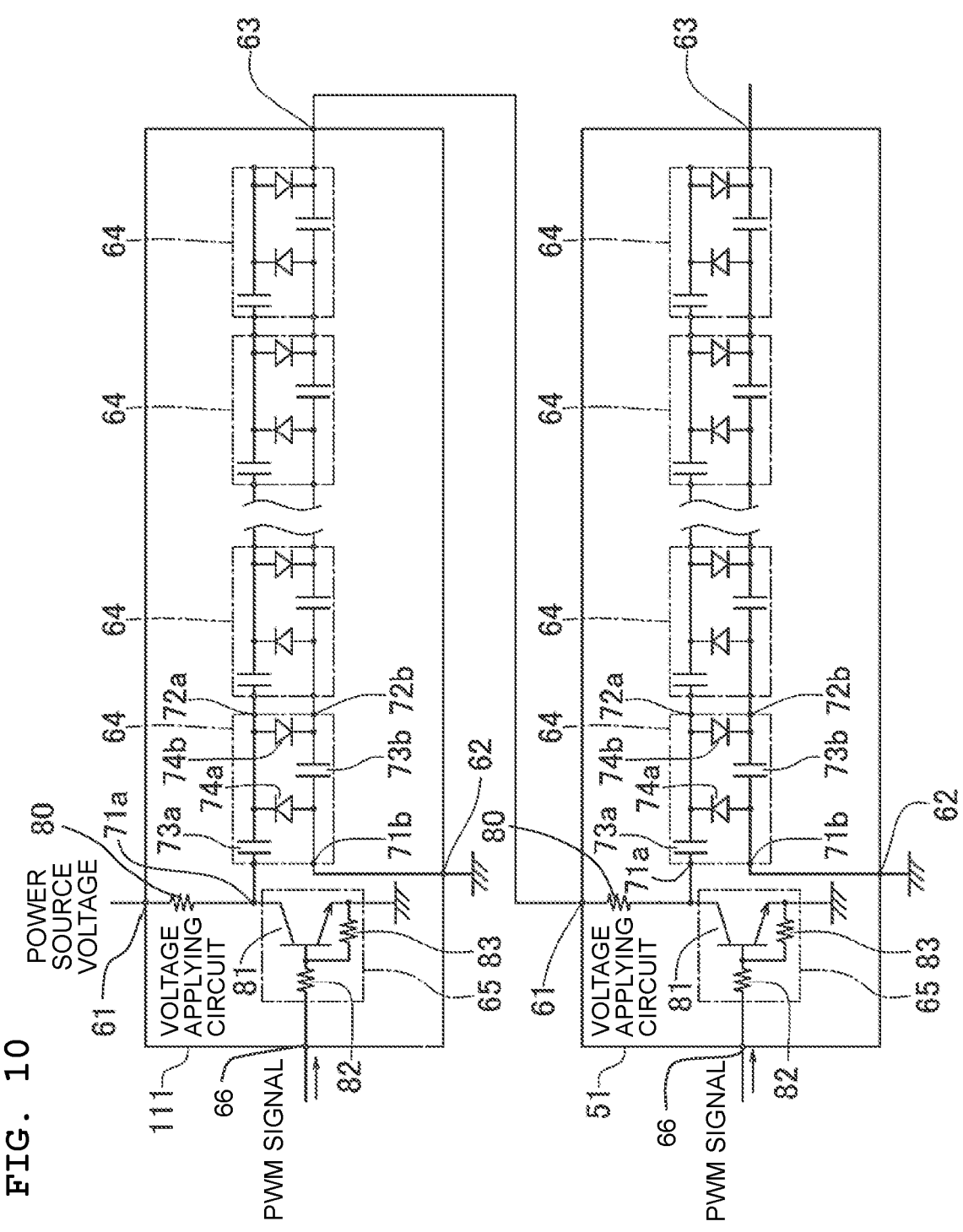
FIG. 10 is a view for explaining an example wherein the voltage to be input to the first voltage input part is adjusted by a voltage adjusting circuit having charge pumps 64.

In a second modification, as depicted in FIG. 10, a voltage adjusting circuit 111 is connected to the first voltage input part 61 of the voltage applying circuit 51. The voltage adjusting circuit 111 has a circuit configuration similar to that of the voltage applying circuit 51. Note, however, that, the quantity of the charge pump 64 constructing the voltage adjusting circuit 111 may be same as or different from the quantity of the charge pump 64 constructing the voltage applying circuit 51.

Further, a voltage output part 63 of the voltage adjusting circuit 111 is connected to the first voltage input part 61 of the voltage applying circuit 51. Furthermore, a non-illustrated power source circuit is connected to a first voltage input part 61 of the voltage adjusting circuit 111, and a power source voltage is input to the first voltage input part 61. Note that in the second modification, the voltage adjusting circuit 111 corresponds to the "input voltage changing part" of the present disclosure.

In the second modification, by inputting the PWM signal to a PWM signal input part 66 in the voltage adjusting circuit 111, the input voltage is boosted by the plurality of charge pumps 64, in a similar manner as explained regarding the first embodiment, and the boosted voltage is output from the voltage output part 63. Then, the voltage boosted in the voltage adjusting circuit 111 is input to the first voltage input part 61 of the voltage applying circuit 51.

Further, in the second modification, at least one of the duty ratio and the frequency of the PWM signal to be input to the PWM signal input part 66 of the voltage adjusting circuit 111 is changed so as to change the voltage boosting rate in the voltage adjusting circuit 111, thereby making it possible to change the voltage to be output from the voltage output part 63 of the voltage adjusting circuit 111, namely, the voltage to be input to the first voltage input part 61 of the voltage applying circuit 51. Further, by changing the voltage to be input to the first voltage input part 61 of the voltage applying circuit 51, it is possible to adjust the voltage to be output from the voltage output part 63 of the voltage applying circuit 51, in a similar manner as explained regarding the first modification.

Furthermore, in the second modification, it is allowable to change at least one of the duty ratio and the frequency of the PWM signal to be input to the PWM signal input part 66 of the voltage adjusting circuit 111 and to change at least one of the duty ratio and the frequency of the PWM signal to be input to the PWM signal input part 66 (of the voltage applying circuit 51), in a similar manner as in the above-descried embodiment, thereby adjusting the voltage to be output from the voltage output part 63. Alternatively, in the second modification, since the output voltage from the voltage output part 63 can be adjusted by changing at least one of the duty ratio and the frequency of the PWM signal to be input to the PWM signal input part 66 of the voltage adjusting circuit 111, it is allowable to make the duty ratio and the frequency of the PWM signal to be input to the PWM signal input part 66 (of the voltage applying circuit 51) to be constant.

Figure 11:
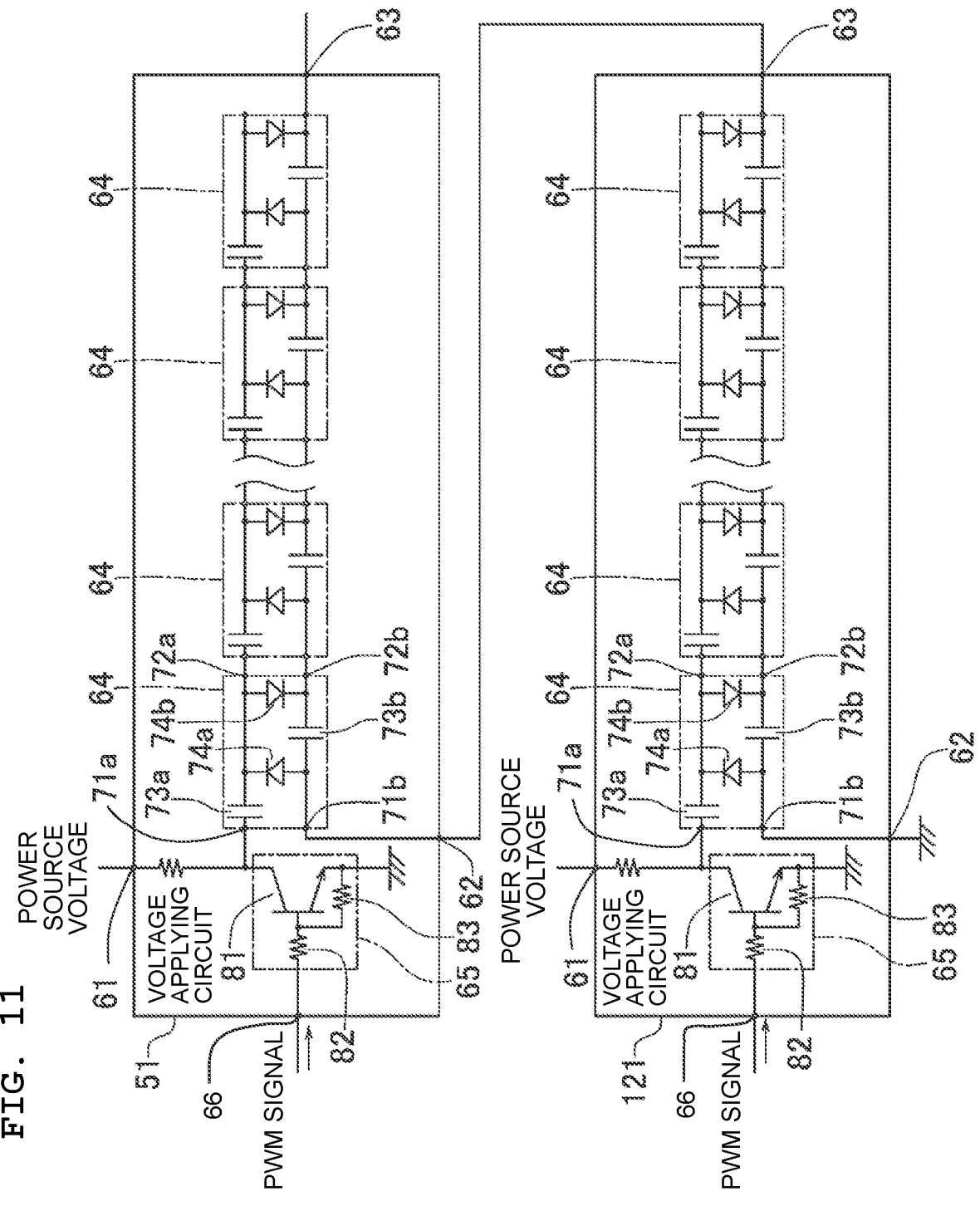
FIG. 11 is a view for explaining an example wherein a voltage to be input to a second voltage input part is adjusted by a voltage adjusting circuit having charge pumps 64.

In a third modification, as depicted in FIG. 11, a voltage adjusting circuit 121 is connected to the second voltage input part 62 of the voltage applying circuit 51. The voltage adjusting circuit 121 has a circuit configuration similar to that of the voltage applying circuit 51. Note, however, that, the quantity of the charge pump 64 constructing the voltage adjusting circuit 121 may be same as or different from the quantity of the charge pump 64 constructing the voltage applying circuit 51. Further, a voltage output part 63 of the voltage adjusting circuit 121 is connected to the second voltage input part 62 of the voltage applying circuit 51.

In the third embodiment, in the voltage adjusting circuit 121, the PWM signal is input to a PWM signal input part 66 so as to boost the input voltage, in a similar manner as explained regarding the above-described embodiment, and the boosted voltage is output from the voltage output part 63. Further, the voltage boosted in the voltage adjusting circuit 121 is input to the second voltage input part 62 of the voltage applying part 51. Note that in the third modification, the voltage adjusting circuit 121 corresponds to the "input voltage changing part" of the present disclosure.

Further, in the third modification, the controller 30 is capable of changing at least one of the duty ratio and the frequency of the PWM signal to be input to the PWM signal input part 66 of the voltage adjusting circuit 121 and to change the voltage boosting rate in the voltage adjusting circuit 121, thereby making it possible to change the voltage to be output from the voltage output part 63 of the voltage adjusting circuit 121, namely, the voltage to be input to the second voltage input part 62 of the voltage applying circuit 51. Further, by changing the voltage to be input to the second voltage input part 62 of the voltage applying circuit 51, it is possible to adjust the voltage to be output from the voltage output part 63 of the voltage applying circuit 51. To provide a more detailed explanation, by making the voltage to be input to the second voltage input part 62 of the voltage applying circuit 51 to be high, it is possible to make the voltage to be output from the voltage output part 63 of the voltage applying circuit 51 to be high. Further, by making the voltage to be input to the second voltage input part 62 of the voltage applying circuit 51 to be low, it is possible to make the voltage to be output from the voltage output part 63 of the voltage applying circuit 51 to be low.

Furthermore, in the third modification, it is allowable to change at least one of the duty ratio and the frequency of the PWM signal to be input to the PWM signal input part 66 of the voltage adjusting circuit 121 and to change at least one of the duty ratio and the frequency of the PWM signal to be input to the PWM signal input part 66 (of the voltage applying circuit 51), in a similar manner as in the above-descried embodiment, thereby adjusting the voltage to be output from the voltage output part 63 (of the voltage applying circuit 51). Alternatively, in the third modification, since the output voltage from the voltage output part 63 of the voltage adjusting circuit 121 can be adjusted by changing at least one of the duty ratio and the frequency of the PWM signal to be input to the PWM signal input part 66 of the voltage adjusting circuit 121, it is allowable to make the duty ratio and the frequency of the PWM signal to be input to the PWM signal input part 66 (of the voltage applying circuit 51) to be constant.

Further, in the first and second modifications, the voltage to be input to the first voltage input part 61 of the voltage applying circuit 51 is changed, without changing the voltage to be input to the second voltage input part 62 of the voltage applying circuit 51, to thereby adjust the voltage to be output from the voltage output part 63 of the voltage applying circuit 51. Further, in the third modification, the voltage to be input to the second voltage input part 62 of the voltage applying circuit 51 is changed, without changing the voltage to be input to the first voltage input part 61 of the voltage applying circuit 51, to thereby adjust the voltage to be output from the voltage output part 63 of the voltage applying circuit 51. The present disclosure, however, is not limited to this. It is allowable to change both of the voltage to be input to the first voltage input part 61 of the voltage applying circuit 51 and the voltage to be input to the second voltage input part 62 of the voltage applying circuit 51, thereby adjusting the voltage to be output from the voltage output part 63 of the voltage applying circuit 51.

Figure 12:
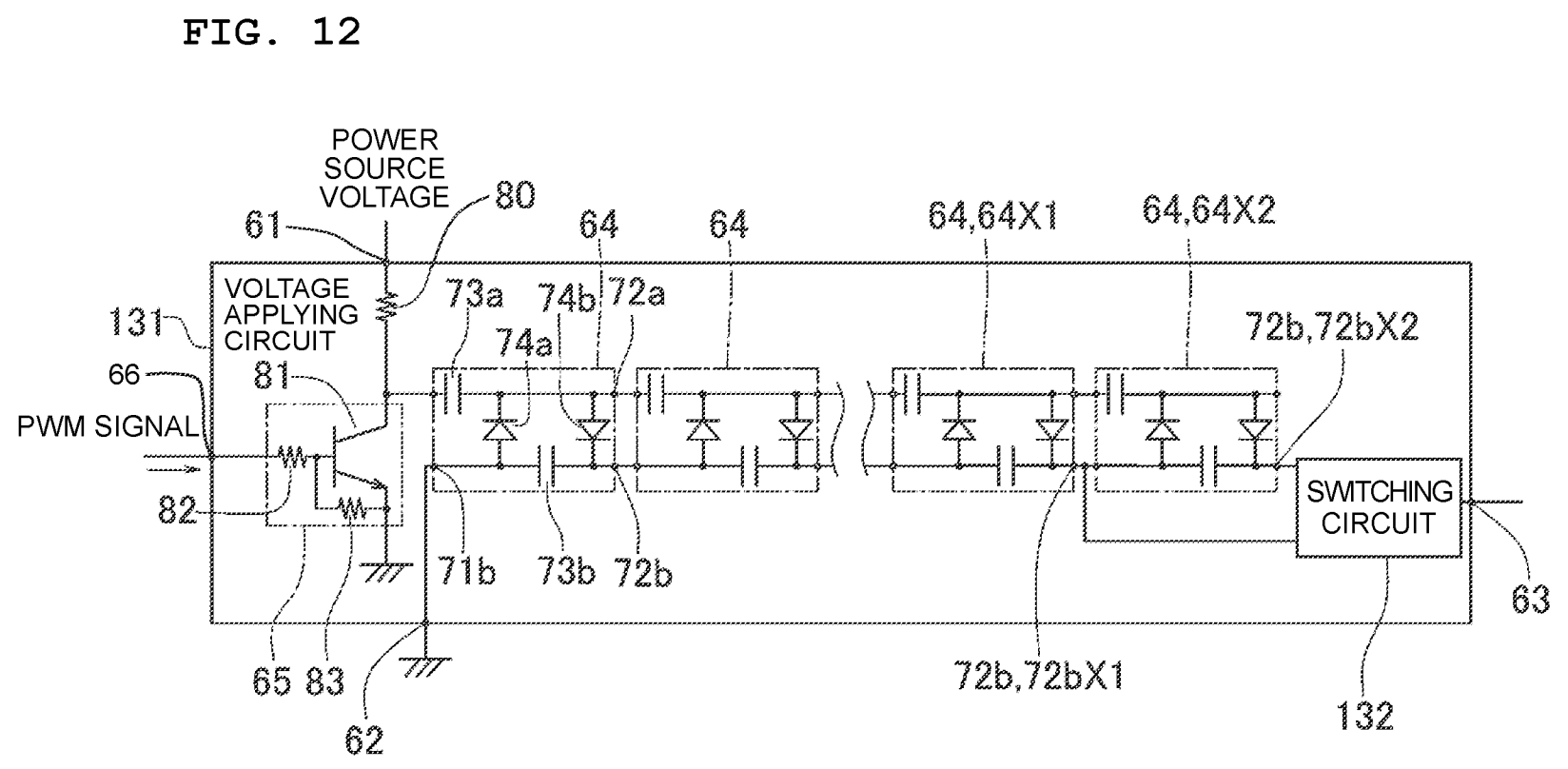

In a fourth modification, as depicted in FIG. 12, a voltage applying circuit 131 has a switching circuit 132, in addition to the configuration similar to that of the voltage applying circuit 51 of the above-described embodiment. The switching circuit 132 is connected to an output part 72bX2 of a rightmost charge pump 64X2, to an output part 72bX1 of a charge pump 64X1 located second from the right side, and to the voltage output part 63. Further, the switching circuit 132 performs switching, by a control of the controller 30, between as to whether the output part 72bX2 of the charge pump 64X2 is to be connected to the voltage output part 63 and whether the output part 72bX1 of the charge pump 64X1 is to be connected to the voltage output part 63. Note that in the fourth modification, the charge pump 64X1 corresponds to a "first charge pump" of the present disclosure, and the charge pump 64X2 corresponds to a "second charge pump" of the present disclosure.

The voltages output from the output parts 72b of the charge pumps 64 are different. In the fourth modification, it is possible to adjust the voltage to be output from the voltage output part 63 by performing the switching between outputting the voltage output from the charge pump 64X2 from the voltage output part 63 and outputting the voltage output from the charge pump 64X1 from the voltage output part 63.

Furthermore, in the fourth modification, although the output part 72bX1 of the charge pump 64X1 and the output part 72bX2 of the charge pump 64X2 are connected to the switching circuit 132, the present disclosure is not limited to this. It is allowable to connect, to the switching circuit 132, an output part 72b of a charge pump 64, among the plurality of charge pumps 64, which is on the left side with respect to the charge pump 64X1 in FIG. 12, rather than connecting the output part 72bX1 of the charge pump 64X1 to the switching circuit 132. Alternatively, it is also allowable to connect not less than three output parts 72b of not less than three charge pumps 64, among the plurality of charge pumps 64, which includes the output part 72bX2 of the charge pump 64X2. Further, it is allowable to perform a switching, in the switching circuit 132, as to which one of the not less than three output parts 72b of the not less than three charge pumps 64 is to be connected to the voltage output part 63. Note that in this situation, a charge pump 64, of arbitrary two charge pumps 64, which is located on the left side in FIG. 12 among the not less than tree charge pumps 64 corresponds to the "first charge pump" of the present disclosure; and that a charge pump 64, of the arbitrary two charge pumps 64, which is located on the right side in FIG. 12 among the not less than tree charge pumps 64 corresponds to the "second charge pump" of the present disclosure.

Furthermore, in the fourth modification, it is allowable to adjust the voltage to be output from the voltage output part 63 by switching, with the switching circuit 132, the connection destination to which the voltage output part 63 is to be connected, and by changing at least one of the duty ratio and the frequency of the PWM signal to be input to the PWM signal input part 66 in a similar manner as in the above-described embodiment. Alternatively, in the fourth modification, since the output voltage from the voltage output part 63 can be adjusted by switching, with the switching circuit 132, the connection destination to which the voltage output part 63 is to be connected, it is allowable to make the duty ratio and the frequency of the PWM signal to be input to the PWM signal input part 66 to be constant.

Still alternatively, in the fourth modification, it is allowable to adjust the voltage to be output from the voltage output part 63 by switching, with the switching circuit 132, the connection destination to which the voltage output part 63 is to be connected, and by changing the voltage which is to be input to at least one of the first voltage input part 61 and the second voltage input part 62 in a similar manner as in any one of the first to third modifications.

Figure 13:
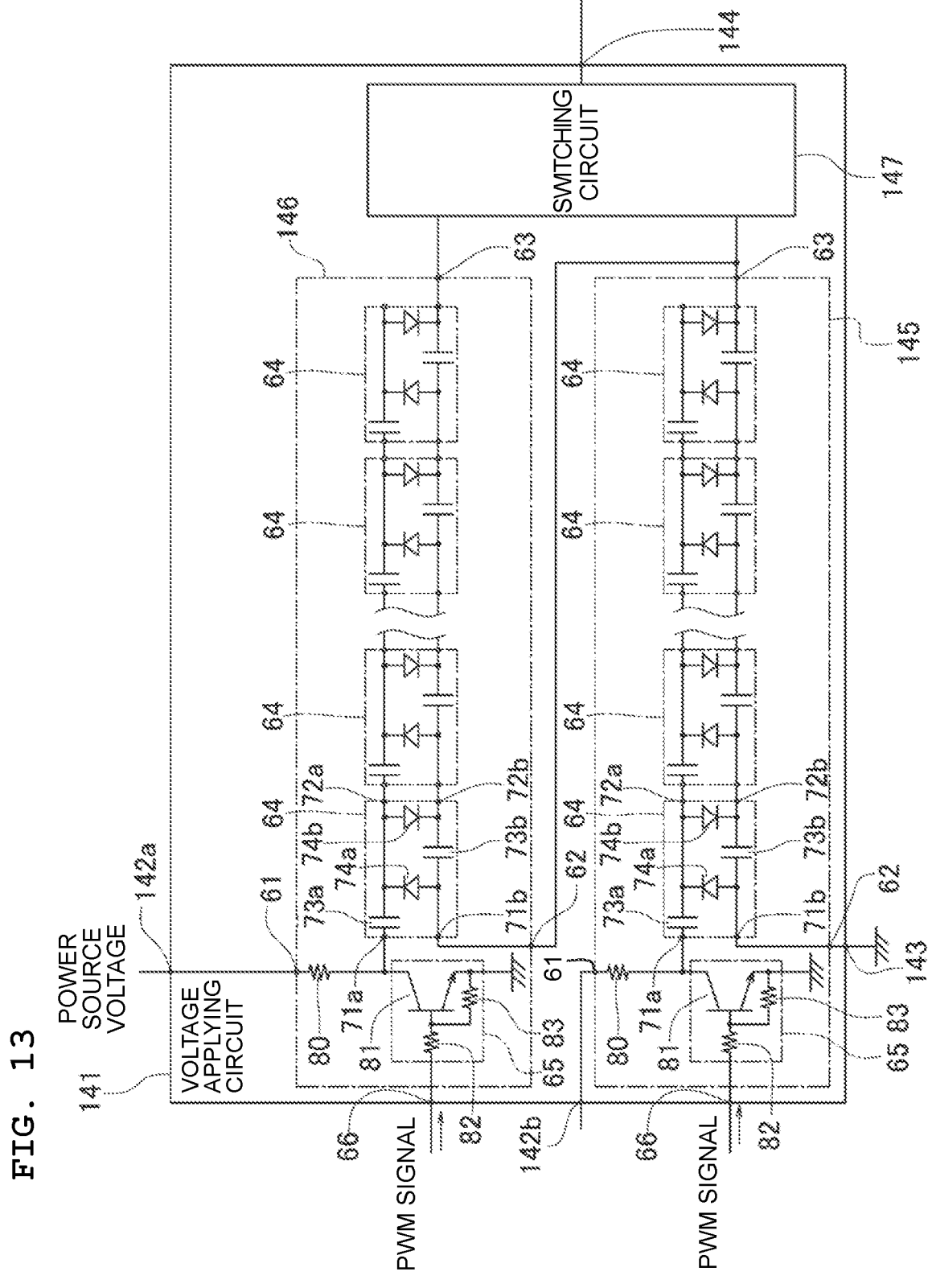
FIG. 13 is a view for explaining an example of switching regarding outputting, from a voltage output part, of an output voltage from which one of two charge pump units.

In a fifth modification, as depicted in FIG. 13, a voltage applying circuit 141 has power source input parts 142a and 142b, a ground connection part 143, a voltage output part 144, two charge pump units 145 and 146, and a switching circuit 147. The power source input parts 142a and 142b are connected to a non-illustrated power source circuit, and the power source voltage is input to the power source input parts 142a and 142b. The ground connection part 143 is maintained at the ground potential. The voltage output part 144 is connected to the electrode 26 via the low pass filter 52, similarly to the voltage output part 63 of the voltage applying circuit 51 of the above-described embodiment.

Each of the charge pump units 145 and 146 has a configuration similar to that of the voltage applying circuit 51 of the above-described embodiment. Note, however, that, the quantity of the charge pump 64 in each of the charge pump units 145 and 146 may be same as or different from the quantity of the charge pump 64 constructing the voltage applying circuit 51 of the above-described embodiment. Further, the quantity of the charge pump 64 in the charge pump unit 145 may be same as or different from the quantity of the charge pump 64 in the charge pump unit 146. For example, the quantity of the charge pump 64 in the charge pump unit 145 may be smaller than the quantity of the charge pump 64 in the charge pump unit 146.

Furthermore, the voltage output part 63 of the charge pump unit 145 and the second voltage input part 62 of the charge pump unit 146 are connected. Moreover, the first voltage input part 61 of the charge pump unit 145 and the first voltage input part 61 of the charge pump unit 146 are connected, respectively, to the power source input parts 142a and 142b, and the power source voltage is input to each of the first voltage input part 61 of the charge pump unit 145 and the first voltage input part 61 of the charge pump unit 146. The second voltage input part 62 of the charge pump unit 145 is connected to the ground connection part 143 and is maintained at the ground potential.

The switching circuit 147 is connected to the voltage output part 63 of the charge pump unit 145, to the voltage output part 63 of the charge pump unit 146 and to the voltage output part 144. Further, the switching circuit 147 performs switching, by a control of the controller 30, between as to whether the voltage output part 63 of the charge pump unit 145 is to be connected to the voltage output part 144 and whether the voltage output part 63 of the charge pump unit 146 is to be connected to the voltage output part 63. With this, it is possible to perform switching between whether the output part 72b of a rightmost charge pump 64 in the charge pump unit 145 as depicted in FIG. 13 is to be connected to the voltage output part 144 and whether the output part 72b of a rightmost charge pump 64 in the charge pump unit 146 as depicted in FIG. 13 is to be connected to the voltage output part 144.

Note that in the fifth modification, the rightmost charge pump 64 in the charge pump unit 145 as depicted in FIG. 13 corresponds to the "first charge pump" of the present disclosure; and the rightmost charge pump 64 in the charge pump unit 146 as depicted in FIG. 13 corresponds to the "second charge pump" of the present disclosure.

In the fifth modification, the voltage output from the voltage output part 63 of the charge pump unit 145 is input to the second voltage input part 62 of the charge pump unit 146. Further, in the charge pump unit 146, the voltage input to the second voltage input part 62 is boosted. Accordingly, the voltage output from the voltage output part 63 of the charge pump unit 145 is different from the voltage output from the voltage output part 63 of the charge pump unit 146. Thus, in the fifth modification, it is possible to adjust the voltage to be output from the voltage output part 144 by performing switching between whether the output part 72b of the rightmost charge pump 64, in the charge pump unit 145 as depicted in FIG. 13 is to be connected to the voltage output part 144 and whether the output part 72b of the rightmost charge pump 64 in the charge pump unit 146 as depicted in FIG. 13 is to be connected to the voltage output part 144.

Furthermore, in the fifth modification, it is allowable to adjust the voltage to be output from the voltage output part 63 by switching, with the switching circuit 147, the connection destination to which the voltage output part 144 is to be connected, and by changing at least one of the duty ratio and the frequency of the PWM signal to be input to the PWM signal input part 66 in at least one of the charge pump units 145 and 146, in a similar manner as in the above-described embodiment. Alternatively, in the fifth modification, since the output voltage from the voltage output part 63 can be adjusted by switching, with the switching circuit 147, the connection destination to which the voltage output part 144 is to be connected, it is allowable to make the duty ratio and the frequency of the PWM signal to be input to the PWM signal input part 66 to be constant.

Still alternatively, in the fifth modification, it is allowable to adjust the voltage to be output from the voltage output part 144 by switching, with the switching circuit 147, the connection destination to which the voltage output part 144 is to be connected, and by changing the voltage which is to be input to the first voltage input part 61 of at least one of the charge pump units 145 and 146, in a similar manner as in the first and second modifications.

Alternatively, in the fifth modification, it is allowable to adjust the voltage to be output from the voltage output part 144 by switching, with the switching circuit 147, the connection destination to which the voltage output part 144 is to be connected, and by changing the voltage which is to be input to the second voltage input part 62 of the charge pump unit 146 in a similar manner as in the third modification.

Further, in the above-described embodiment, in a case that the DC leak current of less than the first predetermined value is detected, the voltage to be output from the voltage applying circuit 51 is adjusted so as to make the ejection detection can be continued. On the other hand, in a case that the DC leak current of not less than the first predetermined value is detected, or that the AC leak current of not less than the second predetermined value is detected, the duty ratio of the PWM signal is set to 0 (zero) and the application of the high voltage to the electrode 26 is stopped. The present disclosure, however, is not limited to this.

For example, it is allowable that the DC leak signal output part 53 is configured to output a DC leak signal indicating that the DC leak current of not less than the predetermined first value flows, namely, configured so as to detect the DC leak current of not less than the first predetermined value, but not to detect the DC leak current of less than the first predetermined value. Further, it is allowable that the DC leak signal output part 53 is configured not to adjust the voltage to be output from the voltage applying circuit 51 in a case that the DC leak current of less than the first predetermined value flows.

Furthermore, one of the DC leak signal output part 53 and the AC leak signal output part 56 may be omitted. Namely, it is also allowable to detect only one of the DC leak current and the AC leak current.

Moreover, both of the DC leak signal output part 53 and the AC leak signal output part 56 may be omitted. Namely, it is also allowable to detect neither one of the DC leak current and the AC leak current.

Further, in the above-described embodiment, the current flowing in the electrode 26 in a case that the voltage is applied thereto by the voltage applying circuit 51 is not limited to being to be less than 100 µA, and may be not less than 100 µA.

Furthermore, in the above-described embodiment, the voltage which is less than 50V and which is input to the voltage applying circuit 51 is boosted to the voltage of not less than 300V by the voltage applying circuit 51. Moreover, in the above-described embodiment, the input voltage is boosted, by the voltage applying circuit 51, to a voltage not less than ten times the input voltage. Further, in the above-described embodiment, the voltage input to the voltage applying circuit 51 is boosted by not less than ten charge pumps 64 which are connected in series. The present disclosure, however, is not limited to these.

For example, the voltage input to the voltage applying circuit 51 may be a voltage of not less than 50V; the voltage output from the voltage applying circuit 51 may be a voltage of less than 300V. Alternatively, the voltage applying circuit 51 may be configured to boost the input voltage to a voltage which is less than ten times the input voltage. Still alternatively, the voltage applying circuit 51 may have not more than nine charge pumps 64 which are connected in series.

Figure 14:
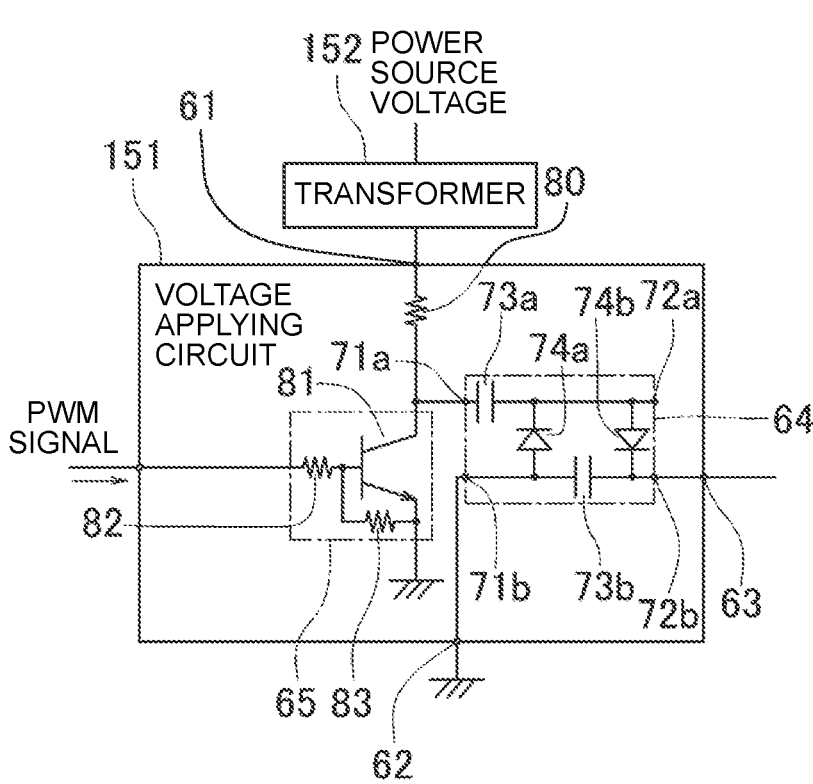
FIG. 14 is a view for explaining an example wherein a voltage applying part has only one charge pump.

Further, the voltage applying circuit 51 is not limited to having the plurality of charge pumps 64. In a sixth modification, as depicted in FIG. 14, a voltage applying circuit 151 has only one charge pump 64. In the sixth modification, a transformer 152 is connected between the first voltage input part 61 and a non-illustrated power source circuit. The transformer 152 boosts the power source voltage input from the power source circuit and outputs the boosted voltage to the first voltage input part 61.

In the sixth modification, it is possible to make the circuit, which is configured to boost the power source voltage up to a voltage required to be applied to the electrode 26, to be small-sized. To provide a more detailed explanation, it is possible to make a circuit constructing the charge pump 64 to have a size smaller than that of a transformer. Further, the transformer 152 is configured to boost the power source voltage to the voltage to be input to the first voltage input part 61; the voltage input to the first voltage input part 61 is lower than the voltage output from the voltage output part 63. Accordingly, the size of the transformer 152 can be made small, as compared with a transformer which is capable of boosting the power source voltage up to the voltage output from the voltage output part 63. With those as described above, a circuit obtained by combining the voltage applying circuit 151 and the transformer 152 of the sixth modification can be made smaller than the circuit which boosts the power source voltage up to the voltage output from the voltage output part 63 only by means of the transformer.

Further, in the above-described embodiment and modifications, there is provided the configuration wherein the voltage is applied to the electrode 26 by the voltage applying circuit and the ink-jet head 4 is maintained at the ground potential so as to generate the potential difference between the electrode 26 and the ink-jet head 4 and so as to output a signal in accordance with the voltage of the electrode 26 to the controller 30. The present disclosure, however, is not limited to this. It is also allowable that the electrode 26 is maintained at the ground potential and that the voltage is applied to the ink-jet head 4 by the voltage applying circuit so as to generate the potential difference between the electrode 26 and the ink-jet head 4, and that a signal in accordance with the voltage of the ink-jet head 4 is output to the controller 30.

Furthermore, in the above-described examples, the controller 30 determines as to whether or not the nozzle 10 has any abnormality, based on the signal output from the amplifier circuit 55 in accordance with the change in the voltage, in the electrode 26 arranged in the inside of the cap 21, in a case that the ink-jet head 4 is caused to perform the ejection driving (from the nozzles 10). The present disclosure, however, is not limited to this.

For example, it is allowable to provide an electrode which extends in a vertical direction and which faces a space below the nozzles 10 in a state that the carriage 2 is positioned at the maintenance position, rather than providing the electrode 26. Further, it is allowable that a signal in accordance with a voltage change of the above-described electrode is output from the amplifier circuit 55 in a case that the ejection driving is performed in the state that the carriage 2 is positioned at the maintenance position. Furthermore, it is allowable that the controller 30 determines as to whether or not the nozzle 10 has the abnormality, based on the signal.

Moreover, in the above-described examples, the controller 30 determines as to whether or not the ink is ejected from the nozzle 10, based on the signal output from the amplifier circuit 55. The present disclosure, however, is not limited to this. It is allowable that the controller 30 determines as to whether or not another abnormality such as, for example, any abnormality in a ejecting direction of the ink, etc., is present in the nozzle 10, based on the signal output from the amplifier circuit 55.

Further, in the above-described examples, the controller 30 determines as to whether or not there is the abnormality in all of the nozzles 10 by causing each of all the nozzles 10 to perform the ejection driving. The present disclosure, however, is not limited to this. For example, it is allowable to perform the ejection driving with respect to a part of the nozzles 10 of the ink-jet head 4, for example, every other nozzle 10 in each of the nozzle rows 9, so as to determine whether or not there is the abnormality in the nozzles 10. Furthermore, it is allowable to presume, with respect to nozzles 10 which are different from the part of the nozzles 10 as to whether or not there is the abnormality in the nozzles 10, based on the result of determination regarding the above-described part of the nozzles 10.

Further, in the above-described embodiment, although the explanation has been made regarding the example wherein the present disclosure is applied to a printer provided with a so-called serial head which ejects the ink from the plurality of nozzles while moving in the scanning direction together with the carriage, the present disclosure is not limited to this. The present disclosure is applicable, for example, also to a printer provided with a so-called line head which extends in the scanning direction over the entire length of a recoding sheet and which has a plurality of nozzles aligned in the scanning direction.

Moreover, in the foregoing description, although the explanation has been given about the example wherein the present disclosure is applied to the printer which ejects the ink from the nozzles so as to perform recording on the recording sheet S, the present disclosure is not limited to this. The present disclosure may be applied also to a printer which performs recording on a recording medium different from the recording sheet, such as a T-shirt, a sheet for outdoor advertisement, a case of a mobile terminal such as a smartphone, etc., a corrugated cardboard, a resin member or material, etc. Further, the present disclosure may be applied also to a liquid ejecting apparatus which ejects a liquid droplet different from the ink droplet, such as a liquid droplet of a liquified resin or of metal, etc.

What is claimed is:

1. A liquid ejecting apparatus comprising:
   a liquid ejecting head including a nozzle and configured to eject a liquid from the nozzle;
   a signal output part including an electrode and configured to output a signal in accordance with an electric change in the electrode in a case that the liquid is ejected from the nozzle; and
   a voltage applying circuit including a plurality of charge pumps connected in series, the plurality of charge pumps each including a capacitor and a diode and configured to boost a voltage, the voltage applying circuit being configured to apply the voltage boosted by the plurality of charge pumps to the liquid ejecting head or to the electrode, so that a potential difference between the liquid ejecting head and the electrode is generated, wherein the capacitor included in each of the plurality of charge pumps is independent from a capacitor component of the liquid ejecting head.

2. The liquid ejecting apparatus according to claim 1, wherein the voltage applying circuit is configured to boost a voltage of 50V or less input to the voltage applying circuit up to a voltage of not less than 300V using the plurality of charge pumps.

3. The liquid ejecting apparatus according to claim 1, wherein the voltage applying circuit is configured to boost a voltage input to the voltage applying circuit by 10 or more times using the plurality of charge pumps.

4. The liquid ejecting apparatus according to claim 1, wherein the voltage applying circuit includes the plurality of charge pumps, not less than ten in number.

5. The liquid ejecting apparatus according to claim 1, further comprising a controller, wherein the voltage applying circuit further includes a switching element configured to perform switching of a state of electric charge to the capacitor by a voltage input to each of the plurality of charge pumps and a state of electric discharge from the capacitor, the controller is configured to control the switching element by a PWM signal to switch the state of electric charge and the state of electric discharge in each of the plurality of charge pumps, thereby adjusting the voltage to be applied to the liquid ejecting head or to the electrode.

6. The liquid ejecting apparatus according to claim 1, further comprising:

a controller; and an input voltage changing part configured to change the voltage to be input to the voltage applying circuit, wherein the controller is configured to control the input voltage changing part to change the voltage to be input to the voltage applying circuit, so that the voltage to be applied to the liquid ejecting head or to the electrode is adjusted.

7. The liquid ejecting apparatus according to claim 1, further comprising a controller, wherein the plurality of charge pumps includes a first charge pump and a second charge pump configured to output a voltage higher than a voltage output from the first charge pump, the voltage applying circuit further includes a switching part, and the controller is configured to control the switching part to perform switching between whether the voltage output from the first charge pump is to be applied to the liquid ejecting head or to the electrode and whether the voltage output from the second charge pump is to be applied to the liquid ejecting head or to the electrode, so that the voltage to be applied to the liquid ejecting head or to the electrode is adjusted.

8. The liquid ejecting apparatus according to claim 1, wherein a magnitude of an electric current flowing through the liquid ejecting head or the electrode to which the voltage is applied by the voltage applying circuit is 100 μA or less.

9. The liquid ejecting apparatus according to claim 1, wherein the capacitor included in each of the plurality of charge pumps is a ceramic capacitor.

10. The liquid ejecting apparatus according to claim 5, further comprising a leak detecting circuit configured to detect a leak current flowing between the liquid ejecting head and the electrode, wherein the controller is configured to adjust a voltage to be output from the voltage applying circuit in accordance with a result of detection by the leak detecting circuit.

11. The liquid ejecting apparatus according to claim 10, wherein the controller is configured to raise the voltage to be output from the voltage applying circuit in response to the leak detecting circuit detecting the leak current.

12. The liquid ejecting apparatus according to claim 5, wherein the controller is configured to reduce a duty ratio of the PWM signal to zero in a case that a magnitude of a leak current detected by a leak detecting circuit is not less than a predetermined value.

13. The liquid ejecting apparatus according to claim 5, wherein a leak detecting circuit includes:

a first leak detecting circuit configured to detect a DC leak current which is a direct current; and a second leak detecting circuit configured to detect an AC leak current which is an alternate current, and in a case that a magnitude of the DC leak current detected by the first leak detecting circuit exceeds a first predetermined value, or in a case that a magnitude of the AC leak current detected by the second leak detecting circuit exceeded a second predetermined value, the controller is configured to reduce a duty ratio of the PWM signal to zero.

14. A liquid ejecting apparatus comprising:

a liquid ejecting head including a nozzle and configured to eject a liquid from the nozzle;

a signal output part including an electrode and configured to output a signal in accordance with an electric change in the electrode in a case that the liquid is ejected from the nozzle; and a voltage applying circuit including a charge pump, the charge pump including a capacitor and a diode and configured to boost a voltage input to the charge pump, the voltage applying circuit being configured to apply the voltage boosted by the charge pump to the liquid ejecting head or to the electrode, so that a potential difference between the liquid ejecting head and the electrode is generated, wherein the capacitor included in the charge pump is independent from a capacitor component of the liquid ejecting head.

* * * * *